US00RE36341E

United States Patent [19]

Howell

[11] E Patent Number: Re. 36,341

[45] Reissued Date of Patent: Oct. 12, 1999

[54] AUTOMATIC SAMPLE CONTAINER HANDLING CENTRIFUGE AND A ROTOR FOR USE THEREIN

[75] Inventor: Gary Wayne Howell, Elkton, Md.

[73] Assignee: Dade Behring Inc., Deerfield, Ill.

[21] Appl. No.: 09/031,203

[22] Filed: Feb. 26, 1998

Related U.S. Patent Documents

Reissue of:

[64] Patent No.: 5,551,941
Issued: Sep. 3, 1996
Appl. No.: 08/461,466
Filed: Jun. 5, 1995

U.S. Applications:

[63] Continuation-in-part of application No. 08/136,353, Oct. 14, 1993, abandoned.

[51] Int. Cl.[6] ..... B09B 5/02

[52] U.S. Cl. ..... 494/16; 221/82; 221/89; 422/72; 436/45

[58] Field of Search ..... 221/82, 86, 89, 221/113; 422/72, 101; 436/45, 177; 494/16, 21, 31

[56] References Cited

U.S. PATENT DOCUMENTS

| | | | |
|---|---|---|---|
| 2,500,644 | 3/1950 | Connell | 221/113 |
| 2,828,005 | 3/1958 | Rocke | 221/89 |
| 2,935,225 | 5/1960 | Jordan | 221/113 |
| 3,635,394 | 1/1972 | Natelson . | |
| 4,208,484 | 6/1980 | Sogi et al. | 435/286 |
| 4,501,565 | 2/1985 | Piramoon | 494/85 |
| 4,685,853 | 8/1987 | Roshala | 414/404 |
| 4,795,612 | 1/1989 | Keller | 422/101 |
| 4,927,545 | 5/1990 | Roginski | 210/745 |
| 4,961,906 | 10/1990 | Anderson | 436/45 |
| 5,000,343 | 3/1991 | Allen | 221/82 |
| 5,077,013 | 12/1991 | Guigin | 494/16 |
| 5,122,343 | 6/1992 | Ishizaka et al. | 422/66 |
| 5,133,208 | 7/1992 | Ducci | 494/16 |
| 5,166,889 | 11/1992 | Cloyd | 364/510 |
| 5,169,600 | 12/1992 | Ishizaka et al. | 422/66 |
| 5,171,532 | 12/1992 | Columbus et al. | 422/72 |
| 5,441,165 | 8/1995 | Kemp et al. | 221/82 |

FOREIGN PATENT DOCUMENTS

| | | |
|---|---|---|
| 2519111 | 7/1976 | Germany . |
| 535 073 | 6/1972 | Switzerland . |
| WO94/18557 | 8/1994 | WIPO . |

OTHER PUBLICATIONS

Derwent Patent World index No. 81–K101D/39–Russian Patent No. SU–794240–B Abstract. Jan. 1981.

IBM Tech. Discl. Bulletin vol. 29, No. 5, pp. 1945, 2149–2151, Oct. 1986.

*Primary Examiner*—Terrance R Till
*Attorney, Agent, or Firm*—Leland K Jordan

[57] ABSTRACT

A centrifuge instrument and a rotor therefor which is loaded with sample containers automatically by gravity through an opening in a cover located over a core and, subsequent to centrifugation, is unloaded automatically, again assisted by gravity, through an opening in a floor disposed beneath the core. A sample container loading arrangement is provided to hold a plurality of sample containers and to individually present sample containers to the rotor.

23 Claims, 19 Drawing Sheets

AUTOMATIC SAMPLE CONTAINER HANDLING CENTRIFUGE AND A ROTOR FOR USE THEREIN

Matter enclosed in heavy brackets [ ] appears in the original patent but forms no part of this reissue specification; matter printed in italics indicates the additions made by reissue.

This application is a continuation-in-part of application Ser. No. 08/136,353, filed Oct. 14, 1993, now abandoned.

BACKGROUND OF THE INVENTION

1. Field of the Invention

The present invention relates to a centrifuge instrument and a centrifuge rotor for use therein for centrifuging a sample of a liquid in preparation for subsequent analysis, and more particularly, to an instrument and rotor able to load and unload automatically a container having a sample therein.

2. Description of the Prior Art

Currently, prior to analysis, it is the practice in some standard laboratory procedures to use centrifugal force to separate a liquid sample, such as a sample of a body liquid (e.g., blood) into various fractions in accordance with their differing density. The sample of liquid is carried in a container, such as a test tube, which is inserted into a centrifuge rotor. The rotor is mounted on the upper end of a shaft that projects upwardly into a chamber, or bowl. The bowl is supported on the interior of the housing of the centrifuge instrument. The shaft is connected to a motive source which, when activated, rotates the rotor to a predetermined rotational speed. Centrifugal force acts on the sample carried within the container and causes the components thereof to separate in accordance with their density.

Since in a typical laboratory setting it may be necessary to separate a relatively large number of samples within a given time period, manual loading and unloading of the sample containers into a centrifuge rotor may require an inordinate amount of time. Moreover, during handling of the sample containers the potential exists that an operator may be exposed to the sample if an accident occurs or if the container is damaged or mishandled. Accordingly, the prior art has developed various robotic devices for automatically loading and unloading sample containers into a centrifuge rotor.

U.S. Pat. No. 5,171,532 (Columbus et al.) discloses an analyzer having an incubator and a centrifuge instrument therein. The centrifuge rotor rotates about a horizontal axis. Owing to the horizontal orientation of the axis of rotation sample containers are mechanically inserted into and mechanically pushed from the rotor in a horizontal direction.

U.S. Pat. No. 4,501,565 (Piramoon) discloses a gravity feed apparatus for locking a bucket onto the trunnion arms of a swinging bucket centrifuge rotor.

U.S. Pat. No. 3,635,394 (Natelson) describes a system having clothes pin-like clamps for loading and unloading sample containers to and from a centrifuge rotor. The containers are presented to and carried away from the respective loading and unloading clamps on respective first and second conveyors.

U.S. Pat. No. 4,927,545 (Roginski) discloses a robotic gripper designed to load blood tubes into a centrifuge rotor. The tubes are brought to the gripper on a first carrier. After centrifugation the gripper removes the tubes from the rotor and places them into a second carrier.

U.S. Pat. No. 4,685,853 (Roshala) describes a manual tool used as an aid in sequentially loading microelectronic components from a carrier stick into an insert in the rotor of a centrifuge. After the centrifuging operation the insert is removed from the rotor and the manual tool is used to return the components into the carrier stick.

U.S. Pat. No. 5,166,889 (Cloyd) discloses a robotic arrangement that grasps a rotor loaded with sample containers and transfers the rotor onto and from the shaft of a centrifuge instrument.

Accordingly, in view of the foregoing it is believed to be advantageous to provide a centrifuge instrument which uses gravitational force both to load each of a plurality of sample containers into a centrifuge rotor and also to unload the sample containers from the rotor after centrifugation.

SUMMARY OF THE INVENTION

The present invention is directed toward a centrifuge instrument and to a rotor for use therein. Sample containers are loaded into and unloaded from the rotor using the force of gravity.

The rotor includes a core having at least one container-receiving cavity extending completely therethrough. A floor having an unloading port therein is disposed beneath the core. A first latch is provided for selectably latching the floor and the core. In the latched state the core and the floor are connected together in a closed position in which a portion of the floor closes the cavity in the core. In an unlatched state the core is movable with respect to the floor to bring the cavity in the core into registration with the unloading port in the floor to permit a sample container received within the cavity to drop by gravity from the core through the unloading port.

A cover having at least one loading port therein is disposed over the core. The cover is secured to the core with the loading port aligned with the cavity. In an alternate embodiment, a second latch selectably latches the core to the cover so that, in the latched state, the core to the cover move as a unit. In an unlatched state the core and the cover are movable with respect to each other to a loading position in which the loading port registers with the cavity in the core. In the loading position a sample container drops by gravity into the cavity in the core through the loading port.

BRIEF DESCRIPTION OF THE DRAWINGS

The invention will be more fully understood from the following detailed description taken in connection with the accompanying drawings, in which.

DETAILED DESCRIPTION OF THE INVENTION

Figure 1:
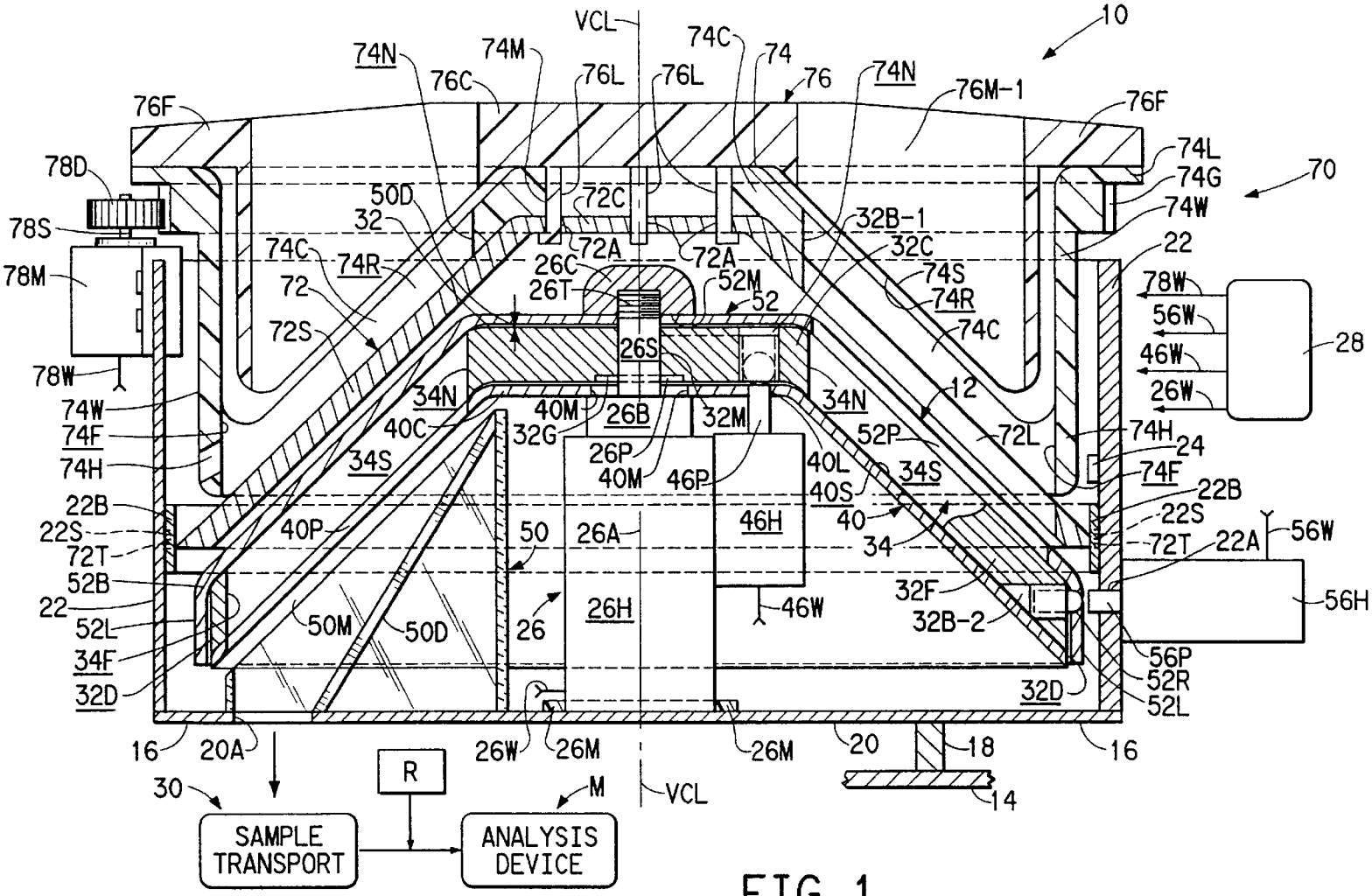
FIG. 1 is side elevational view entirely in section of a centrifuge instrument having a rotor thereon, both as in accordance with the present invention.

Throughout the following detailed description similar reference characters refer to similar elements in all figures of the drawings.

Figure 7:
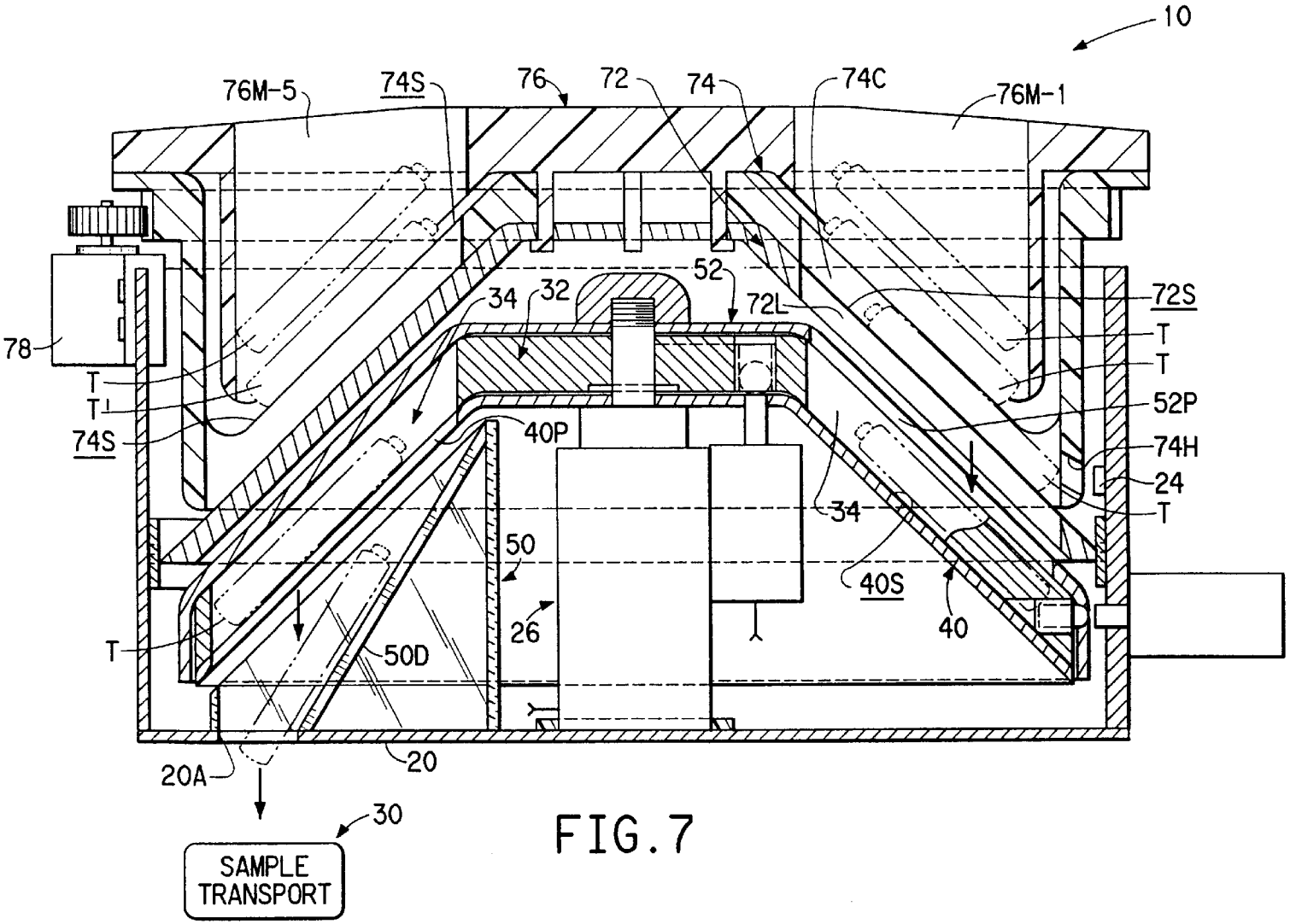
FIG. 7 is a side elevational view similar to FIG. 1 illustrating the instrument and a rotor for use therein in accordance with the present invention as sample containers are loaded into and unloaded from the rotor.
Figure 8:
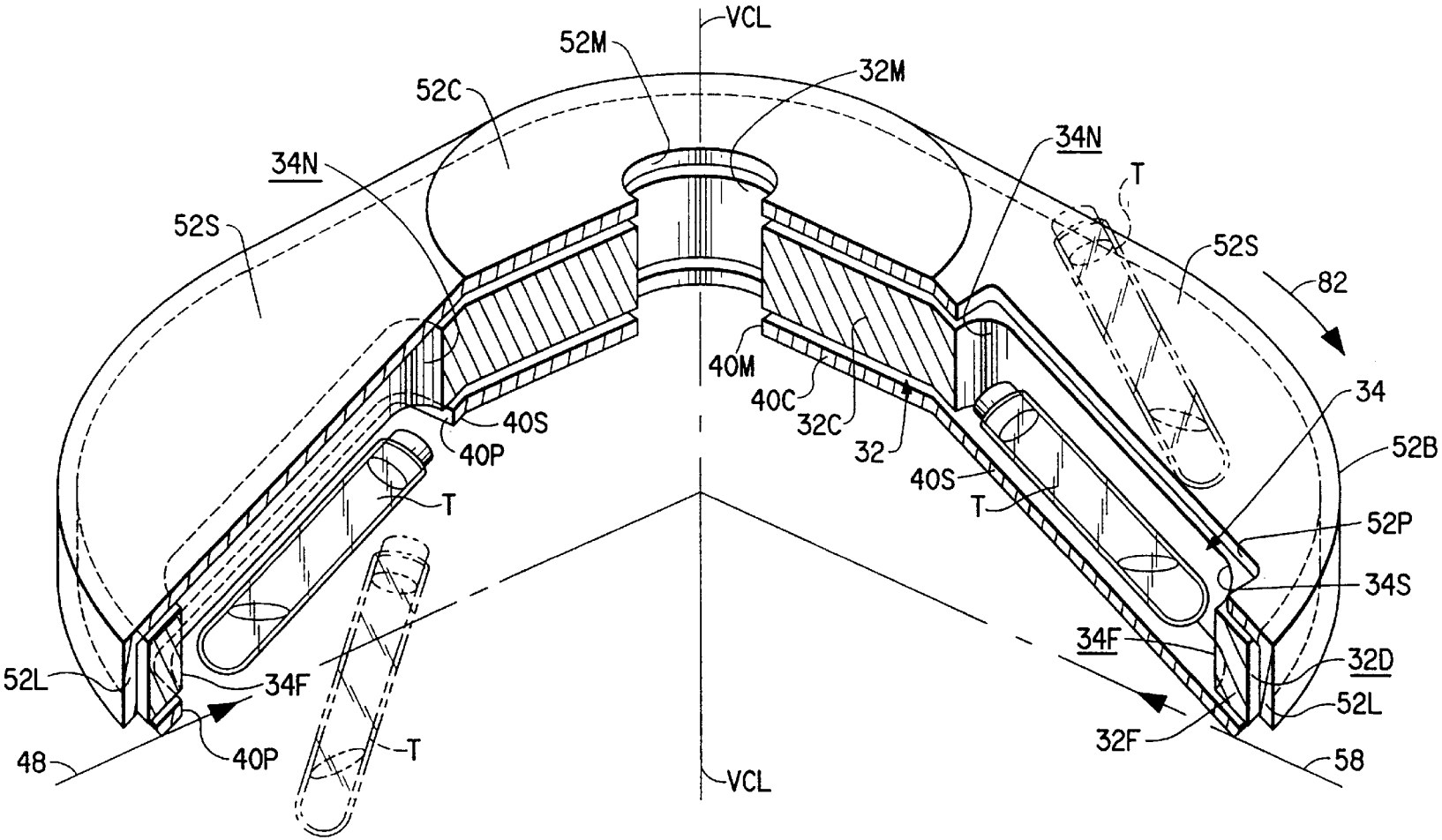
FIG. 8 is an isolated perspective view of a rotor in accordance the present invention with a portion thereof cut away illustrating the simultaneous loading and unloading of sample containers into and from the rotor.

The present invention is directed to a centrifuge instrument generally indicated by reference character 10 and to a rotor, itself generally indicated by reference character 12, for use therein. Most generally speaking, the instrument 10 and a rotor 12 therefor are operative to expose any material or member, when carried in a container, to a centrifugal force field. More typically, the instrument 10 and the rotor 12 are used to expose a sample of a liquid (including a slurry of liquid and solids) carried in a suitable container to a centrifugal force field. In the most preferred instance, the instrument 10 and a rotor 12 are used to expose a sample of a patient's body liquids (e.g., blood) to a centrifugal force field, thereby to separate the sample into its components in accordance with their density. The instrument 10 and rotor 12 in accordance with the present invention are particularly adapted to handle presently available forms of so-called "primary tubes", i.e., stoppered sample tubes T as seen in FIGS. 7 and 8. A primary tube is that container into which the sample of the patient's body liquid is introduced upon collection. Examples of presently available primary tubes able to be handled by the instrument and rotor of the present invention include: those containers sold by Becton Dickinson and Company, Franklin Lakes, N.J., as "Vacutainer Plus", "Vacutainer Plus SST" and "Vacutainer Plus With Hemogard"; the container sold by Sarstedt Inc., Arlington Heights, Ill., as "Monovette"; and the container sold by Terumo Medical Corporation, Somerset, N.J., as "Venoject II".

In accordance with the present invention, as will be described completely herein, gravitational force is used both to load automatically each of a plurality of sample containers T into the centrifuge rotor 12 and also to unload automatically the sample containers T from the rotor 12 after centrifugation. The centrifuge instrument 10 is adapted to function as a "stand alone" mode or as a "front end" sample preparatory instrument useful in conjunction with a sample test analyzer.

However used, the instrument 10 includes a suitable support framework 14 (a portion of which is illustrated schematically in FIG. 1). The framework 14 supports a chamber, or bowl, 16 on suitable members 18 (also schematically represented) in a fixed disposition within the instrument 10. The bowl 16 is itself comprised of a base 20 and a cylindrical sidewall 22. Each of the base 20 and the sidewall 22 have a respective aperture 20A, 22A therein, while a circumferentially extending mounting band 22B extends about the interior surface of the sidewall 22, all for a purpose to be described. The band 22B has slots 22S therein. If desired the sidewall 22 may be used to provide a guard ring function to protect in the event of rotor failure. To this end the sidewall 22 may be connected, as by shear pins or the like (not shown), to the base 20, so that the sidewall 22 may rotate with respect thereto to absorb energy of fragments produced by a rotor failure. Other appurtenances, such as one or more additional guard ring(s), are omitted from the Figures for clarity of illustration.

A sensor 24 is mounted to the inside surface of the sidewall 22. The sensor 24 is mounted so as to exhibit a zone of sensitivity that is oriented in a generally inwardly inclined upwardly direction.

A motive source for the instrument, such as a servo motor 26 is mounted to and supported by the base 20. To accommodate vibration and motor displacement caused by forces associated with the passage of the rotor through its critical speed, the motor 26 is soft-mounted on elastomeric motor mounts 26M. A servo motor is believed most advantageous for use as the motive source for the instrument 10 due to the ability of such a motor to provide both the necessary angular resolution to accurately position the rotor 12 about the axis of rotation, and the power necessary to drive the rotor 12 to rotational speeds on the order of thirty three hundred (3300) rpm. Suitable for use as the servo motor 26 is the device manufactured by PMI Motion Technologies, Commack, N.Y., and sold as model number PB09A2. As known by those skilled in the art a servo motor includes an encoder wheel having a high resolution (on the order of two thousand counts per turn) and sensor therefor, as well as a discrete home position sensor whereby a predetermined point on the motor shaft may be accurately located at a predetermined angular "home position" with respect to the axis of rotation of the shaft and with respect to the bowl 16.

The motor 26 includes a stator housing 26H having a rotatable shaft 26S extending centrally and axially therethrough. The shaft 26S has a collar 26B thereon. The upper end of the shaft 26S is threaded, as at 26T, to receive a threaded cap 26C. The axis 26A of the motor shaft 26S defines the central axis of the instrument 10 and the central axis of rotation of any rotor 12 mounted thereon. The axis of the instrument and the axis of rotation of the rotor are both hereafter referred to by the characters "VCL". A drive pin 26P extends transversely from the shaft 26S for a purpose to be described. Drive control signals are applied to the motor 26 from an instrument control network, generally indicated by the reference character 28, over lines 26W. In practice the instrument control network 30 is preferably implemented by a microprocessor-based controller operating in accordance with a series of stored instructions.

A sample container transport arrangement 30 is supported within the framework 14. The transport arrangement 30, which is indicated schematically in FIG. 1, may take any one of a variety of forms, consistent with the environment in which the instrument 10 is used. For example, if the instrument 10 were used in the role of a "front end" preparatory instrument in conjunction with a sample test analyzer, the transport arrangement may take the form of a serpentine belt to convey sample containers from the instrument 10 to another location. The transport arrangement 30 is preferably positioned beneath the aperture 20A in the base 20. When used in a stand alone environment, the transport arrangement 30 may, for example, be implemented using a replaceable carousel or wire rack.

When the instrument 10 and rotor 12 are used in the context of a sample test analyzer the sample containers are conveyed by the transport arrangement 30 to the sample input section of a suitable sample analysis device, indicated in FIG. 1 by the reference character M. It should be understood that the schematic representation of the sample analysis device M is meant to include any desired form of sample analysis device, including but not limited to a colorimetric, a turbidimetric, and/or a potentiometric sample analysis device. To facilitate identification each of the individual sample containers T may carry a suitable identifying indicia thereon. A reader schematically indicated by the reference character R is disposed along the path of transport of the containers toward the analysis device M. In a typical instance the containers T may each carry a bar-coded identifying label readable by a bar code reader.

Figure 3:
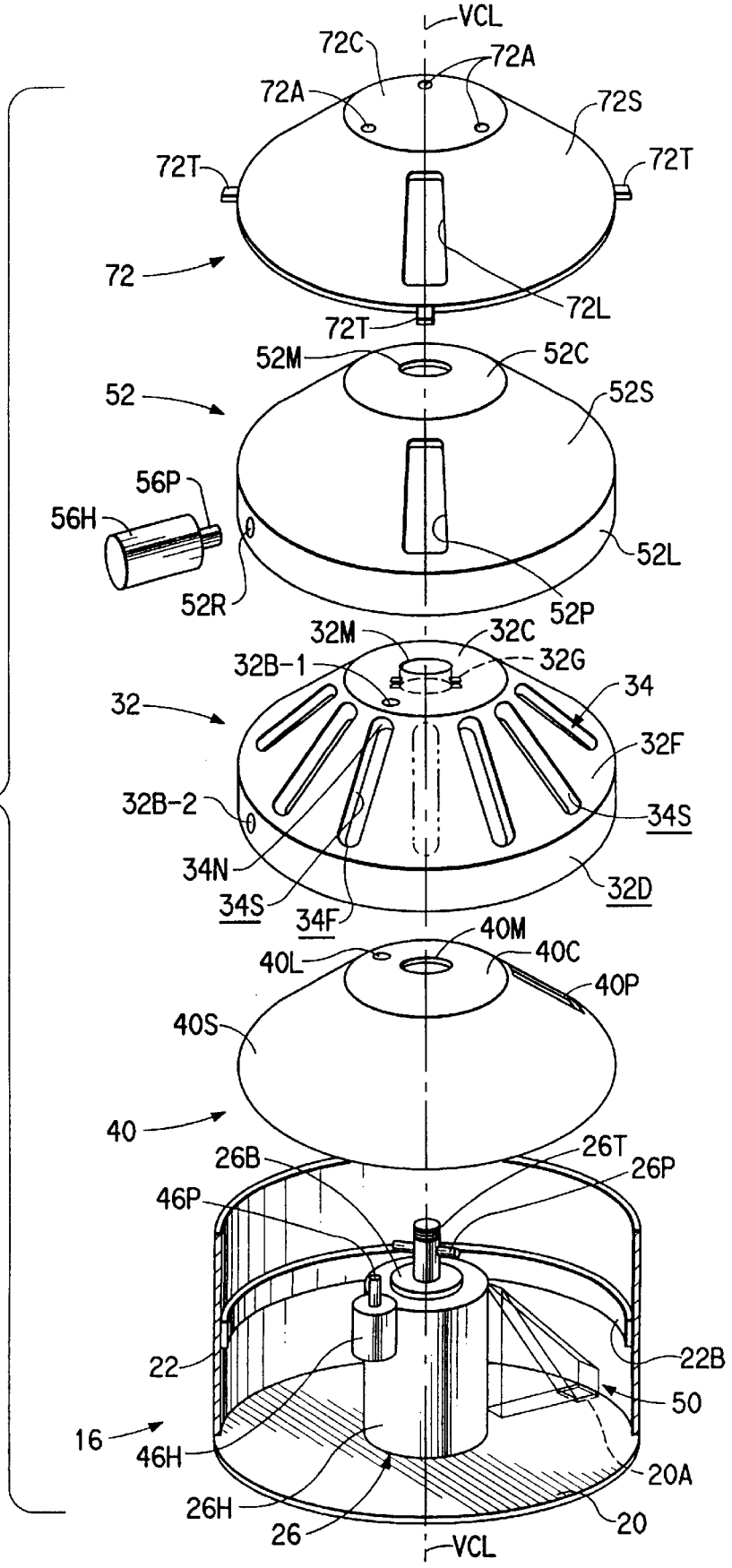
FIG. 3 is an exploded view showing in perspective various components of the centrifuge instrument of FIG. 1.
Figure 4A:
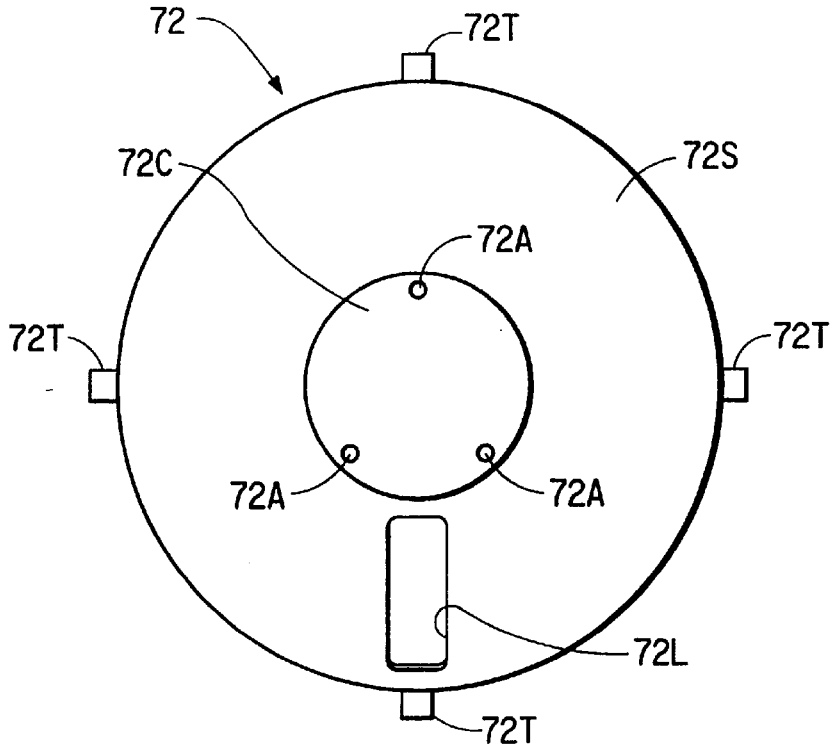
FIGS. 4A, 4B, 4C and 4D are plan views of some of the various components of the centrifuge instrument as shown in FIG. 3.
Figure 4B:
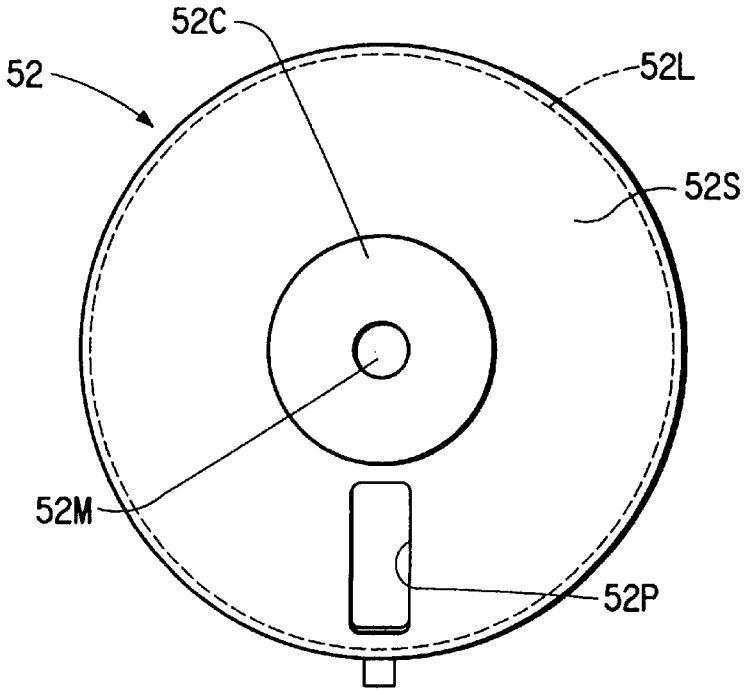
Figure 4C:
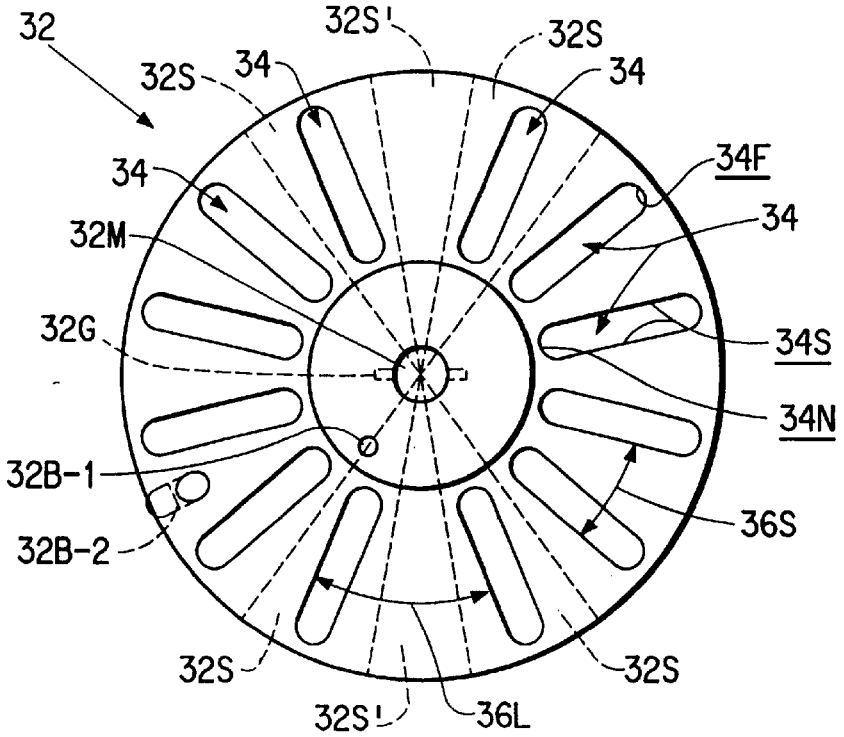

As seen from FIGS. 1, 3 and 4C, the centrifuge rotor 12 is a fixed angle rotor comprising a core 32 having a generally cylindrical central portion 32C and a generally frustoconical radially outward portion 32P thereon. In the preferred case the frustoconical radially outward portion 32P defines a forty-five degree angle with respect to the cylindrical central portion 32C. The cylindrical central portion 32C has a core mounting aperture 32M extending centrally and axially therethrough. The undersurface of the cylindrical central portion 32C has a groove 32G formed therein. The groove 32G is sized to mate with the drive pin 26P on the shaft 26S. Disposed in the central portion 32C, generally adjacent to the frustoconical portion 32F, is a recess, in the form of a first bore 32B-1, the purpose of which will become clearer hereinafter.

The core 32 is subdivisible into a plurality of angularly adjacent segments 32S some of which are indicated in FIG. 4C. Preferably the segments are equally sized. The frustoconical radially outward portion 32F of at least one of the segments 32S has a sample container-receiving cavity 34 disposed therein. Preferably, in practice, a plurality of the segments 32S have a sample container-receiving cavity 34 provided therein. Each cavity 34 is sized to receive any of a plurality of sizes of sample container T. The cavities 34 are preferably equally sized.

The surface of the core 32 in at least two of the segments 32S is left intact. That is, in those segments (denoted in FIG. 4C by the reference numerals 32S' and herein termed the "solid" segments) no sample container-receiving cavity 34 is provided so that the surface of the core is uninterrupted. The solid segments 32S' are preferably symmetrically disposed with respect to each other. Most preferably, the rotor 12 includes at least two such solid segments 32S' which are diametrically disposed on the core 32. It should be understood that the undersurface of the core 32 in the solid segments 32S' may be hollowed, if desired, to more precisely control symmetry of weight distribution. Owing to the provision of the solid segments 32S' a predetermined point of some of the cavities 34 is angularly spaced from the corresponding predetermined point of an adjacent cavity 34 by a first angular distance 36S, while the predetermined point on others of the cavities 34 are angularly spaced from the corresponding predetermined point on an adjacent cavity 34 by a second, greater, angular distance 36L. The greater angular separation 36L follows from the provision of the solid segments 32S' on the core 32.

Any convenient number of segments 32S may be provided with a cavity 34. The number of cavities 34 in the rotor is dependent upon the use to which the rotor 12 is being employed. The cavities 34 may be disposed in any convenient pattern in the rotor 12 to maintain symmetrical weight balance. Factors such as the size of the sample container T and expected throughput (i.e., the number of sample containers processed through the instrument 10 in a given time) are considered in sizing the rotor 12 and determining the number of cavities 34 therein. For example, in the instance when the rotor 12 is being used to spin a sample carried in a blood collection tube one-half inch in diameter and four inches in stoppered length, a core 32 having an outer diameter of twelve inches and provided with twelve sample-receiving cavities 34 is satisfactory. In addition to the twelve segments 32 having a sample-receiving cavities 34 therein two diametrically opposed solid segments 32S' are also defined so that the core 32 remains symmetrically weight-balanced.

As is best appreciated from FIG. 8 each sample container-receiving cavity 34 extends completely through the core 32 from the upper surface thereof ("the entry surface") to the lower surface thereof ("the removal surface"). Each cavity 34 is defined by a pair of generally radially extending, parallel sidewalls 34S joined at their radially inner end by a inner boundary wall 34N and at their radially outer end by a outer boundary wall 34F. In the preferred instance the boundary walls 34N and 34F are disposed parallel to the central axis of rotation VCL of the rotor 12.

The radially outermost extent of the frustoconical portion 32F of the core 32 is truncated to define a generally cylindrical, vertically extending boundary surface 32D. The boundary surface 32D is parallel to the central axis of rotation VCL. A second recess, in the form of a second bore 32B-2, extends into the frustoconical radially outward portion 32F of the core 32 from the boundary surface 32D, for a purpose to be made more clear herein.

Figure 4D:
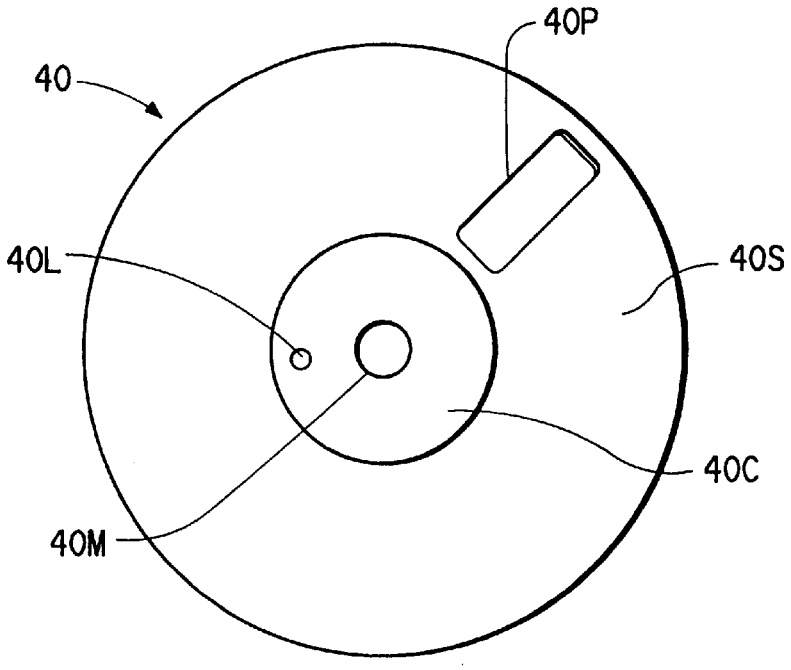
Figure 5B:
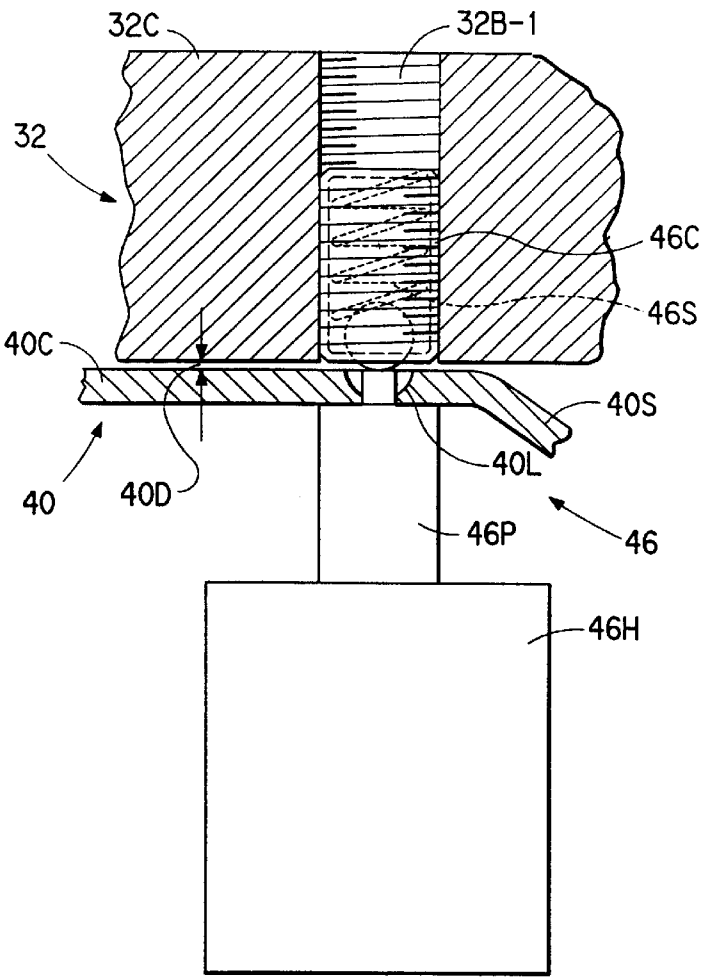
FIGS. 5A and 5B are enlarged views of a portion of FIG. 1 illustrating, in section, a preferred form of latch for selectably latching the core to the floor, these members being illustrated in the latched state in FIG. 5A and in the unlatched state in FIG. 5B.
Figure 5A:
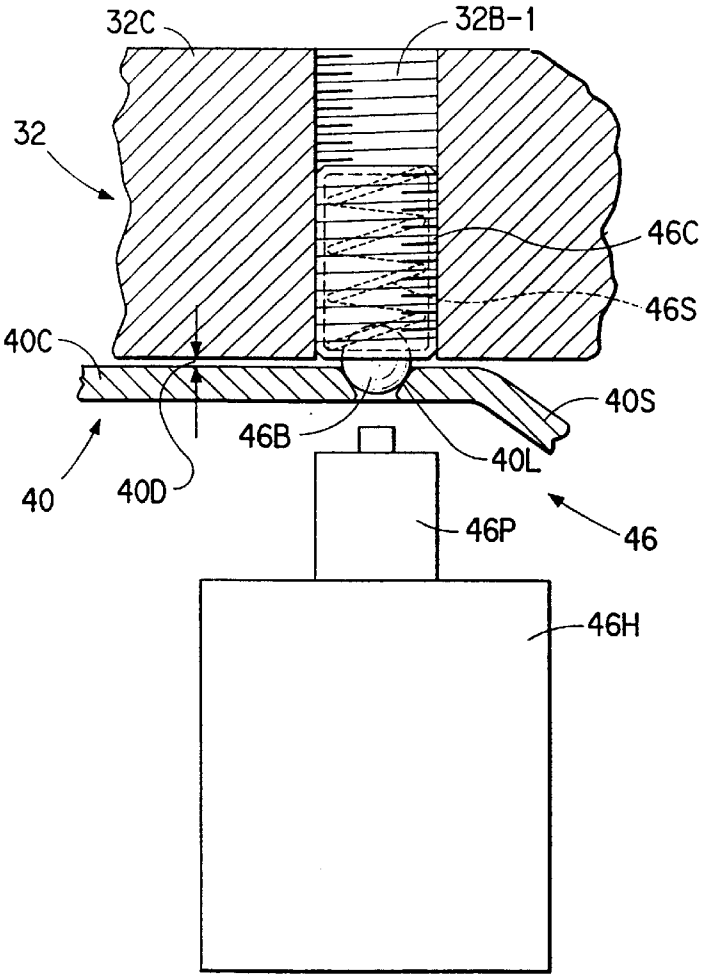

The rotor 12 further comprises a floor 40 disposed under the core 32. The floor 40 is preferably implemented in the form seen in FIGS. 1, 3 and 4D. The floor 40 has a generally cylindrical central portion 40C with a generally frustoconical radially outward skirt portion 40S extending therefrom. In the preferred case the frustoconical radially outward skirt 40S defines a forty-five degree angle with respect to the cylindrical central portion 40C. The skirt portion 40S has a generally smooth outer surface, interrupted by an unloading port 40P formed therethrough. The surfaces of the port 40P adjacent the radially inner and radially outer ends thereof should be parallel to the axis of rotation. The cylindrical central portion 40C of the floor 40 is provided with a floor mounting aperture 40M and a latching opening 40L (FIGS. 5A, 5B).

When the rotor 12 is assembled (as best seen in FIG. 1) the floor 40 and the core 32 are in a nested relationship with each other. When nested the cylindrical portion 40C of the floor 40 and the cylindrical portion 32C of the core 32 lie in vertical next-adjacency with the respective mounting apertures 40M, 32M therein in axial registration with each other and with the central axis VCL of the instrument. The latching opening 40L in the floor 40 registers with the first bore 32B-1 in the core 32. The core 32 and the floor 40 are contoured such that central portions 32C, 40C respectively thereof are separated by a relatively small distance 40D (FIG. 5A), while the frustoconical portions 32F, 40S, respectively, are in contact with each other.

Also, when the core 32 and the floor 40 are nested the frustoconical skirt 40S of the floor 40 lies in vertical next-adjacency beneath the frustoconical portion 32F of the core 32. The surface of the skirt 40S serves to close the bottom of each of the cavities 34 in the core 32.

A first latch 46 is provided for selectably latching the floor 40 and the core 32. The first latch 46 is provided between the corresponding confronting cylindrical central portions 32C, 40C of the core 32 and the floor 40, respectively. When in the latched state, i.e., when the latch 46 is asserted (FIG. 5A), the core 32 is connected to the floor 40 so that both are able to rotate together as a unit. However, when in the unlatched state (FIGS. 1 and 5B), i.e., when the latch 46 is retracted to disconnect the core 32 from the floor 40, the core 32 and the floor 40 are movable with respect to each other.

As seen in FIGS. 5A and 5B the first latch 46 includes a latching member in the form of a detent ball 46B housed within a casing 46C. The casing 46C is received in the first bore 32B-1 formed in the central portion 32C of the core 32. To facilitate the receipt of one within the other, both the casing 46C and the bore 32B-1 may be threaded. Other mounting expedients, such as a press fit, may alternatively be used. The latching member may alternatively be implemented using a pin instead of a ball. In FIG. 5A a spring 46S biases the detent ball 46B from the casing 46C and urges a portion thereof into latching engagement with the latching opening 40L formed in the central portion 40C of the floor 40. In the context of the embodiment illustrated in FIG. 5A the latching state is thus achieved when the extending portion of the detent ball 46B is received by the latching opening 40L in the floor 40, thereby to connect the floor 40 to the core 32. For reasons that are apparent herein the first latch 46 must be located at a confronting location between the core 32 and the floor 40 where the detent ball 46B can not engage any opening other than the latching opening 40L provided for its receipt.

The first latching system 46 includes a latch release mechanism in the form of an extensible plunger 46P housed within a housing 46H. For convenience the housing 46H is mounted to the housing 26H of the servo motor 26 (FIGS. 1, 3). As is best illustrated in FIG. 5B the plunger 46P responds to an actuating force and extends from the housing 46H to engage the portion of the detent ball 46B received by the latching opening 40L in the floor 40 and to urge the detent ball 46B therefrom, thereby to unlatch the floor 40 from the core 32. When in the unlatched state (FIG. 5B) the core 32 is rotatably movable with respect to the floor 40 on the bearing surface defined between the nested frustoconical portions 32F, 40S of the core 32 and the floor 40, respectively.

The actuating force for extending the plunger 46P is generated in the preferred instance by an electrically operated solenoid disposed within the housing 46H. The solenoid is connected to the instrument control network 28 over a line 46W. The length of the spring 46S is adjusted, or other suitable alterations effected, so that the spring rate of the spring 46S is compatible with the actuating force generated by the solenoid.

The plunger 46P, when extended into the latching opening 40L, serves the additional function of locking the floor 40 stationary with respect to the bowl 16 of the instrument at a first predetermined angular position with respect to the axis of rotation VCL of the instrument 10. This first predetermined angular position is indicated by the reference character 48 (e.g., FIG. 8). The first angular position 48 is that angular position at which the unloading port 40P is located when the floor 40 is locked stationary with respect to the axis VCL by the plunger 46P.

An unloading chute 50, best seen in FIG. 1, is supported on the base 20 of the bowl 16 at the first angular position 48. The chute 50 has an open mouth 50M that is closely disposed beneath the floor 40. A deflection plate 50D within the chute 50 communicates with the aperture 20A in the base 20. The sample container transport arrangement 30 is preferably positioned beneath the chute 50 to collect sample containers T (FIG. 8) unloaded by gravity from the rotor 12.

The rotor 12 further includes, in one preferred instance, a cover 52 disposed above the core 32. As seen in FIGS. 1, 3 and 4B the cover 52 has a generally cylindrical central portion 52C with a generally frustoconical radially outward skirt portion 52S. The cylindrical central portion 52C of the cover 52 has a cover mounting aperture 52M therein. For reasons of structural rigidity a portion of the radially outer extent of the skirt 52S is formed, as at 52B, to define an downwardly depending annular lip 52L. The lip 52L has a latching recess 52R formed therein. The skirt portion 52S of the cover 52 has a generally smooth outer surface interrupted only by a loading port 52P formed therethrough. Again, in the preferred case the frustoconical radially outward skirt 52S defines a forty-five degree angle with respect to the cylindrical central portion 52C. The surfaces of the loading port 52P adjacent the radially inner and radially outer ends thereof should also be parallel to the axis of rotation. In some instances it may be desirable to omit the cover 52 from the rotor 12. [Alothough] *Although* not preferred, such a rotor configuration may be used so long a suitable mechanism is porvided to constrain the sample containers in the rotor 12 during centrifugation and the motor has sufficient torque to overcome windage effects.

When the rotor 12 is assembled (as also best seen in FIG. 1) the cover 52 and the core 32 are nested with each other with corresponding portions thereof lying above in vertical next-adjacency to each other. The respective mounting apertures 52M, 32M therein are axially registered with each other, and with the mounting aperture 40M in the floor 40. The core 32 and the cover 52 respectively are contoured such that central portions 32C, 52C thereof are separated by a relatively small distance 52D (FIG. 1), while the frustoconical portions 32F, 52S, respectively, are in contact with each other. In addition, when assembled, the generally cylindrical boundary surface 32D of the frustoconical radially outward portion 32F of the core 32 and the lip 52L on the cover 52 are confrontationally arranged with the latching recess 52R in lip 52L of the cover 52 being angularly registered with the second bore 32B-2 in the core 32.

A second latch 56 is provided for selectably latching the cover 52 and the core 32. The second latch 56 is provided between the confronting cylindrical boundary surface 32D of the core 32 and the lip 52L on the cover 52. When the second latch 56 is in the latched state, i.e., when the latch 56 is asserted (FIGS. 1 and 6A) to connect the core 32 to the cover 52, the core 32 and the cover 52 are able to rotate as a unit. However, when in the unlatched state (FIG. 6B), i.e., when the latch 56 is retracted to disconnect the core 32 from the cover 40, the core 32 and the cover 40 are movable with respect to each other.

Figure 6A:
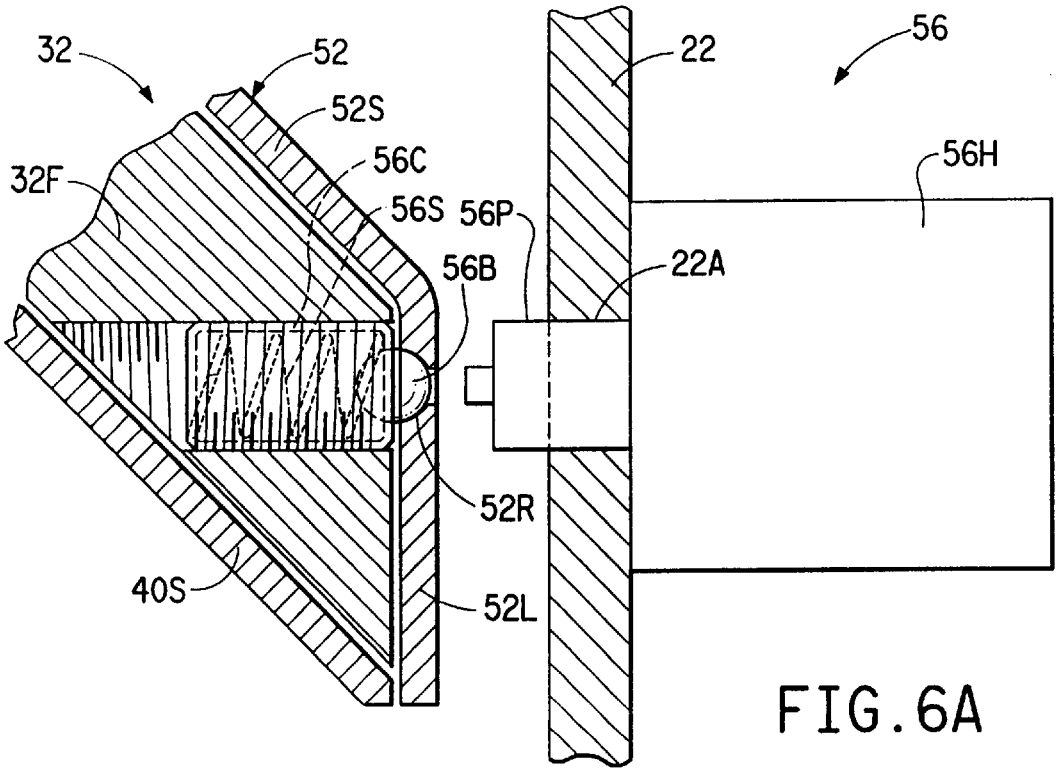
FIGS. 6A and 6B are enlarged views, generally similar to FIGS. 5A and 5B, respectively, of a portion of FIG. 1 illustrating, in section, a preferred form of a latch for selectably latching the core to the cover, these members being illustrated in the latched state in FIG. 6A and in the unlatched state in FIG. 6B.

The second latching system 56 includes a latching member in the form of a detent ball 56B housed within a casing 56C. The casing 56C is threaded (or, alternatively, press fit) into the second bore 32B-2 formed in the radially outer frustoconical portion 32F of the core 32. As seen in FIG. 6A a spring 56S biases the detent ball 56B from the casing 56C and urges a portion thereof into latching engagement with the latching recess 52R formed in the confrontationally disposed lip portion 52L of the cover 52. The latched state of the second latch 56 is achieved when the extending portion of the detent ball 56B is received by the latching recess 52R in the cover 52.

Figure 6B:
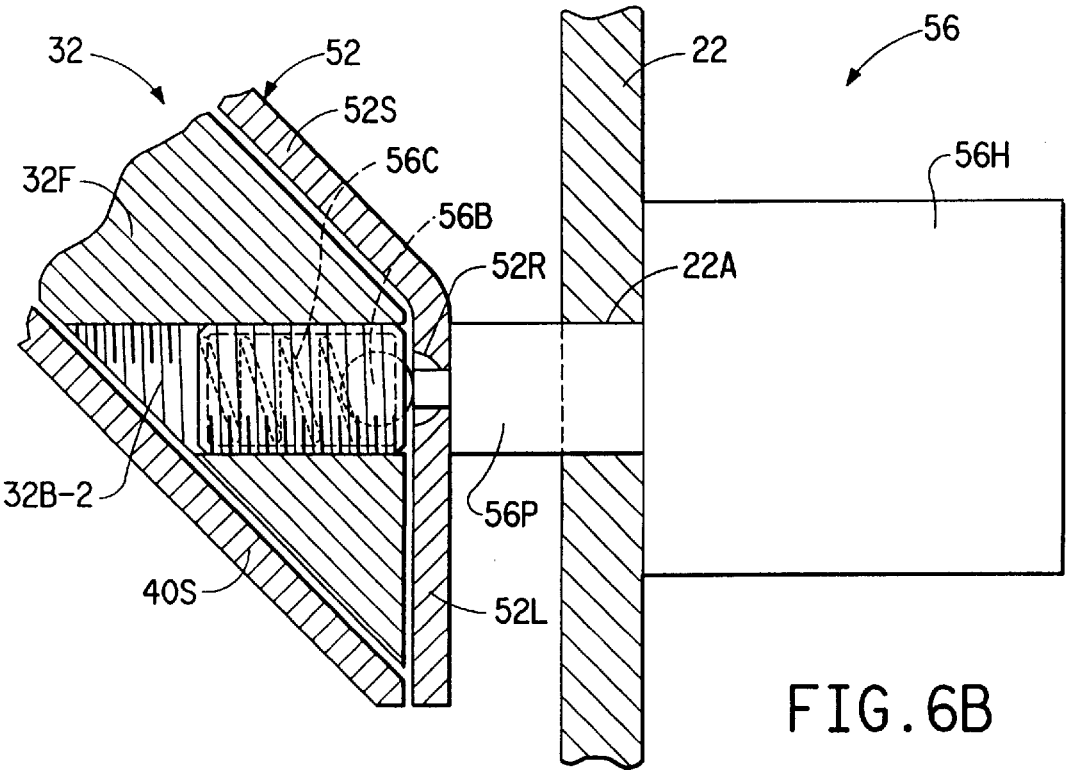

A latch release mechanism for the second latch 56 also takes the form of a plunger 56P housed within a housing 56H. The housing 56H is attached to the exterior of the sidewall 22 of the bowl 16 such that the plunger 56P is received by the aperture 22A therein. As is best illustrated in FIG. 6B the plunger 56P responds to an actuating force and extends from the housing 56H to engage the portion of the ball detent 56B received by the latching recess 52R in the lip 52L of the cover 52 to urge the same therefrom. Urging the detent ball 52B from the recess 52R serves to unlatch the cover 52 from the core 32. When the second latch 56 is in the unlatched state the core 32 is rotatably movable with respect to the cover 52 on the bearing surface defined between the nested frustoconical portions 52S, 32F of the cover 52 and the core 32. Again, the actuating force for the plunger 56P is generated in the preferred instance by an electrically operated solenoid disposed within the housing 56H. The solenoid is connected to the instrument control network 28 over a line 56W.

When extended into the latching recess 52R the plunger 56P serves the additional function of locking the cover 52 stationary with respect to the bowl 16 of the instrument 10 at a second predetermined angular position with respect to the axis of rotation VCL. The second predetermined angular position is indicated by the reference character 58 in FIG. 8. The second angular position 58 is that angular position at which the loading port 52P is located when the cover 52 is locked stationary with respect to the axis VCL by the plunger 56P.

Figure 2:
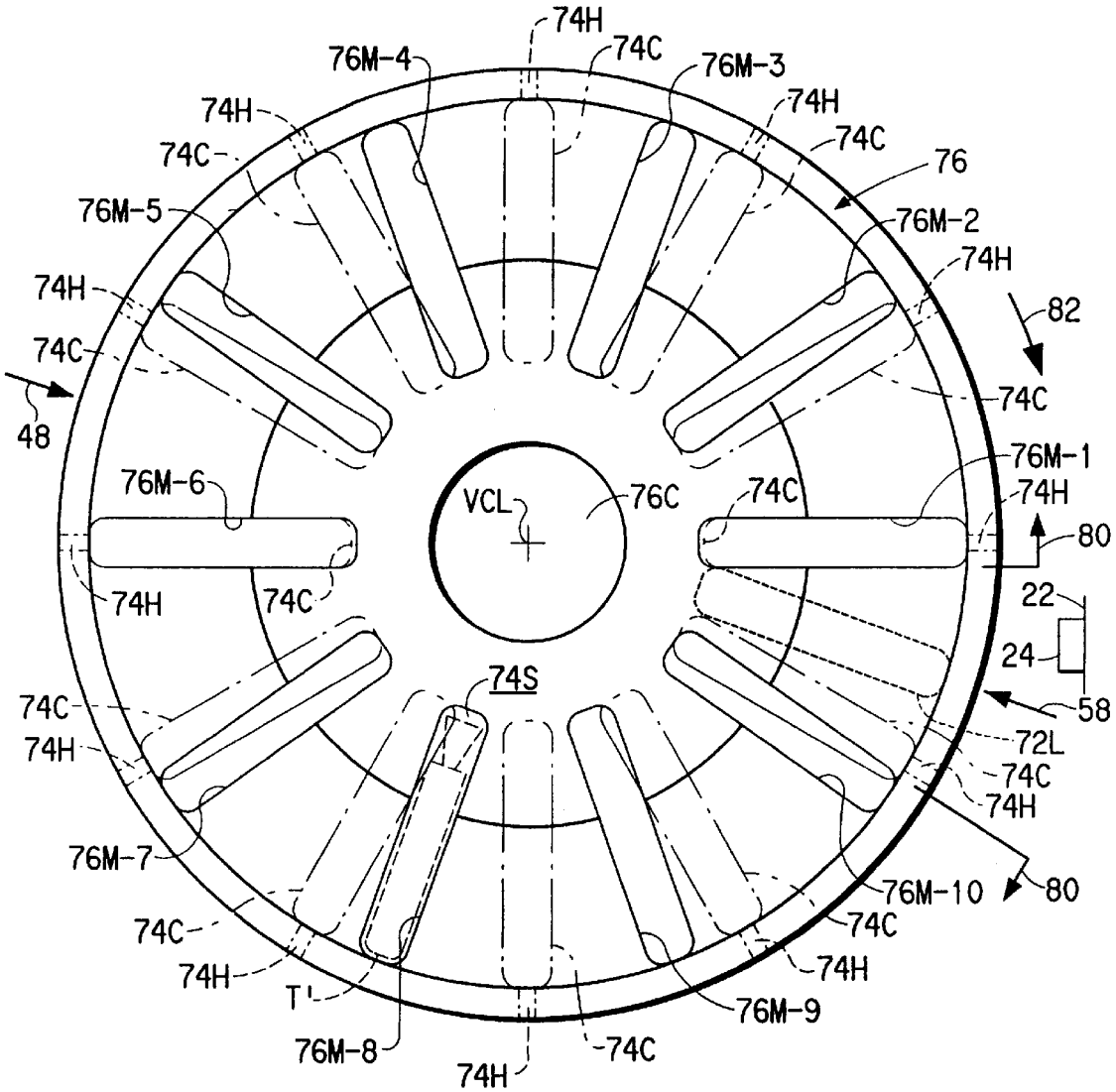
FIG. 2 is plan view of a magazine member used in the sample container loading arrangement of the centrifuge instrument of FIG. 1, with a portion of the radially outer flange of the magazine member being omitted for clarity of illustration.

The relationship among the angular positions 48 and 58 and the sensor 24 is illustrated in FIG. 2.

The core 32 may be fabricated (as by casting or molding) from a suitable rotor material, such as a carbon filament composite material, aluminum, titanium or plastic. The features of the core 32, such as the various cavities, bores, openings and grooves therein, may be formed by any suitable manufacturing technique, such as machining or casting. The floor 40 and the cover 52 are fabricated from a suitable structurally rigid material, preferably aluminum or titanium. Since the floor 40 and the cover 52 are in frictional contact with the core 32 the interface between these members must exhibit sufficient lubricity to permit relative movement. To this end, at least one of the core, on one hand, or the floor 40 and the cover 52, on the other hand, are preferably fabricated from or coated with a low friction polymeric material, such as a polyolefin or tetrafluorethylene material. In any event, the respective features of the floor 40 and the cover 52 are formed by conventional machining.

The various features on the core 32, the floor 40 and the cover 52 are located on these members in such a way that when they are assembled in the nested relationship and the latches 46, 56 are asserted to latch these members together, the rotor 12 is in a "normally closed" (or "parked") condition. In the normally closed condition: (1) the cover 52 is received on the core 32 so that one of the solid segments 32S' in the core 32 is disposed beneath the loading port 52P in the cover 52; and, (2) another (typically a diametrically opposed solid segment 32S' of the core 32) is located above the unloading port 40P in the floor 40. Due to the relationship between the solid segments 32S' of the core 32, the cover 52 and the floor 40, the loading port 52P and the unloading port 40P are thus blocked. In addition, when in the home position, the surface of the skirt 40S of the floor 40 closes the bottom of each of the cavities 34 in the core 32. The term "closes" or "closed", when applied to the relationship between the core 32 and the floor 40 should be understood to include a situation in which at least some portion of the floor 40 serves to block at least partially a cavity 34 in the core so as to prevent a sample container from falling by gravity from that cavity 34 until the floor is removed from its blocking position. When in the home position, the undersurface of the skirt 52S of the cover 52 overlies the top of each of the cavities 34 in the core 32.

Assuming care is taken during the fabrication of the parts and in the location of the latches 46, 56 thereon, the normally closed condition follows as a natural consequence when the core 32 is latched to the floor 40 (via the latch 46) and when the core 32 is latched to the cover 52 (via the latch 56).

When the rotor 12 is received in the instrument 10 the shaft 26S extends through the aligned apertures 40M, 32M and 52M in the floor 40, the core 32 and the cover 52, respectively. The central axis VCL of the instrument extends through the aligned apertures 40M, 32M and 52M. The cylindrical central portion 40C of the floor 40 rests on the collar 26B of the shaft 26S. The pin 26P along the drive shaft 26S is received in the groove 26G in the undersurface of the core 32 (FIG. 1). The cap 26C is threaded onto the upper end of the shaft 26S to secure the core 32, the floor 40, and the cover 52 in the described assembled relationship.

In the preferred case the housings 46H, 56H for the respective latch release mechanisms for the latches 46, 56 are positioned within the instrument in such a way that when the rotor 12 (in the normally closed condition) is received within the instrument and the motor 26 occupies its home angular position the respective plungers 46P, 56P of the latch release mechanisms confront the respective latching openings 40L, 52R provided therefor. That is to say, the housings 46H, 56H are located such that if the solenoids were actuated the plungers 46P, 56P would directly enter the respective openings 40L, 52R and lock the floor and cover, 40, 52, respectively, at the first and second angular positions 48, 58, respectively. Thus, when a normally closed rotor is received on the shaft 26S of the motor 26 that is itself in the home angular position the unloading port 40P is registered with the chute 50, and the loading port 52P is disposed at the second angular position 58. It is noted that the housings 46H, 56H may themselves be conveniently located anywhere in the instrument, and are not necessary required to be located at the first or second angular positions 48, 58. The respective openings 40L, 52R are compatibly located on the parts 40, 52, respectively.

Also embraced within the contemplation of the present invention is an apparatus generally indicated by the reference character 70 for automatically loading a plurality of sample containers T into the rotor 12. The loading apparatus 70, best seen in FIGS. 1 and 2, is disposed above the rotor 12 and comprises a stationary loading tray 72 and an associated stationary magazine member 76, and a loading wheel 74 rotatable with respect thereto. The plurality of sample containers T, which may be variously sized and/or shaped but which typically each carry from five to fifteen milliliters of sample liquid, may be bulk loaded into the magazine member 76, as will be described.

The loading tray 72 (also seen in FIGS. 3 and 4A) is secured above the rotor 12 on the mounting band 22B provided on the interior of the sidewall 22. The tray 72 has a generally cylindrical central portion 72C and a generally frustoconical radially outward skirt portion 72S. The skirt portion 72S inclines forty five degrees with respect to the cylindrical central portion 72C. The central portion 72C has openings 72A therein. The surface of the skirt portion 72S of the tray 72 is interrupted by a loading slot 72L formed therein. The loading slot 72L corresponds in size to the loading port 52P in the cover 52 and to the cavities 34 in the core 32. The radially inner and outer surfaces of the slot 72L are parallel to the axis of rotation VCL.

To mount the tray 72 in fixed relation to the sidewall 22 the tabs 72T on the periphery of the tray 72 are received by the slots 22S in the band 22B. The tray 72 is preferably secured to the sidewall 22 such that the loading slot 72L is disposed at the second angular position 58 with respect to the axis of rotation VCL. Thus, when a normally closed rotor 12 is mounted on the shaft of the motor 26 that is itself in the home angular position, the loading slot 72L in the tray 72 registers vertically with the loading port 52P through the cover 52. The slot 72L is indicated in dotted lines in FIG. 2

The loading wheel 74 has a generally cylindrical central portion 74C with a generally frustoconical radially outward skirt portion 74S that inclines forty five degrees with respect thereto. The central portion 74C has a circular opening 72M therein. Similar to the preferred embodiment of the core 32 the frustoconical radially outward portion 74S of the loading wheel 74 has a plurality of radially extending cavities 74C therethrough. Each of the cavities 74C is indicated in dot-dash lines in FIG. 2. Each cavity 74C is defined by a pair of generally radially extending, parallel sidewalls 74R joined at their radially inner end by an inner boundary wall 74N and at their radially outer end by an outer boundary wall 74F. In the preferred instance the boundary walls 74N and 74F are disposed parallel to the central axis of the instrument and the axis of rotation VCL of the rotor 12. Each cavity 74C extends completely through the wheel 74 and is sized similarly to the cavities in the core 32. A view opening 74H extends in a generally upwardly inclined radial direction through the wheel 74 into communication with each of the cavities 74C. Each of the view openings 74H is also indicated in dot-dash lines in FIG. 2.

The radially outer extent of the skirt 74S has an upwardly ascending annular wall 74W, thereby to impart to the wheel 74 a generally "W" shape when viewed in vertical cross-section (FIG. 1). An annular lip 74L is defined at the upper end of the wall 74W. A gear ring 74G is formed integrally with the outer surface of the wall 74W beneath the lip 74L.

When assembled the loading wheel 74 is coaxially aligned with and nests over the tray 72. The wheel 74 is mounted for rotation with respect to the tray 72 on the bearing surface provided by the nested frustoconical skirt portions 72S, 74S on the tray 72 and on the wheel 74, respectively. The gear ring 74G mates with a driving gear 78D mounted to the end of the shaft 78S of a stepper drive motor 78M. The housing of the motor 78M is conveniently secured to the outer surface of the sidewall 22 adjacent to the rim thereof. Drive control signals are applied to the motor 78M from the instrument control network 28 over lines 78W.

A sample container magazine member 76 is secured above the loading wheel 74. The magazine member 76 includes a cylindrical central portion 76C that inclines outwardly to an annular flange 76F. The flange 76F rests atop the lip 74L of the loading wheel 74. Legs 76L depend from the lower surface of the central portion 76C of the magazine member 76. The legs 76L extend through the opening 74M in the loading wheel 74 and are received by the openings 72A in the central portion 72C of the tray 72, thereby to secure the magazine member 76 thereto. The magazine member 76 has an array of radially extending openings formed therethrough that define sample container-receiving magazines 76M. Any convenient number of magazines 76M may be employed. In the embodiment shown ten magazines 76M-1 through 76M-10 (FIG. 2) are provided. The magazines 76M are disposed within a transfer arc 80 (FIG. 2) defined with respect to the axis of rotation VCL.

The magazine member 76, when mounted within the instrument, lies in close proximity to the loading wheel 74 so that the cavities 74C in the loading wheel 74 communicate with the mouths of the magazines 76M as the loading wheel 74 is rotated therebeneath. Magazines 76M are operative to generate a singulated stream of sample containers T and to sequentially guide each container T in the stream into an empty cavity 74C in the loading wheel 74 as empty cavities 74C are rotated under and presented to a mouth of a magazine 76M. The number of sample containers T received by the magazine member 76 depends on the number of magazines provided and the container capacity of each magazine 76M. In the preferred instance on the order of sixty containers T may be accommodated by the magazine member 76.

In use, care should be taken to insure that when the instrument 10 is assembled the loading wheel 74 occupies a home position with respect to the tray 72 such that the slot 72L in the tray 72 is angularly offset from and does not register with any of the cavities 74C. Care should also be exercised so that in the home position of the loading wheel 74 the cavities 74C in the wheel are also similarly angularly offset with respect to the magazines openings 76M in the magazine plate 76.

The tray 72 may be vacuum formed from a thermoplastic material, such as Kydex® manufactured and sold by Kleerdex of Mt. Laurel, N.J., or ABS plastic. The loading wheel 74 and the magazine member 76 may be made of a high-density structural plastic foam material, for example a polypropylene material. Since the loading wheel 74 is rotatable with respect to the tray, the interface therebetween forms a bearing surface. Accordingly, either the loading wheel 74 or the tray 72 should be made of or coated with a low friction polymeric material to provide the lubricity necessary to facilitate any relative movement.

Operation

Having described the structure of the instrument and of the rotor useful therein, the mode of operation by which the rotor 12 is automatically loaded and unloaded may now be discussed.

Preliminary to loading the rotor the loading wheel 74 must itself be provided with a supply of sample containers T. An operator places a plurality of sample containers T into each of the magazines 76M in the magazine member 76. Containers T of various sizes may be accommodated. The containers T are randomly allocated among the magazines 76M. The only precaution observed is that the stoppered end portion of each sample container T should preferably be radially inwardly directed within each magazine 76M. Each magazine 76M organizes the sample containers T placed therein into a vertical column of singulated containers. Owing to the angular offset between the magazines 76M and the cavities 74C in the loading wheel 74 the lowermost container T in any magazine 76M is supported by a portion of the upper surface of the frustoconical skirt 74S of the loading wheel 74. This condition is suggested in FIG. 2 and FIG. 7 (left hand side) by the tube T' (shown in dashed lines.) It should be noted that in FIG. 7 (both on the right hand and the left hand sides) the tubes T shown in dashed lines are slightly separated for clarity of illustration.

The motor 78 is then actuated to step the loading wheel 74 beneath the magazine member 76. As the loading wheel 74 is rotated (e.g., clockwise in FIGS. 2 and 8, in the direction of the arrow 82) each cavity 74C is brought into registration beneath a mouth of one of the magazines 76M. A sample container T drops by gravity from a magazine 76M into an empty cavity 74C passing therebeneath. A container T received in a cavity 74C is supported on the surface of the skirt 72S of the tray 72. This condition is illustrated in FIG. 7 (right hand side). Owing to the size of the cavities 74C only one sample container T is able to be received in a given cavity. Thus, if a cavity 74C is already filled as it passes beneath a mouth of a magazine a container cannot drop from the magazine into that filled cavity. As the loading wheel 74 is rotated and the cavities 74C that initially happened to be within the transfer arc 80 when the motion of the loading wheel 74 began pass out from the arc 80 the magazines 76M are emptied in sequence.

Loading of the wheel continues until the leading filled cavity in the direction of rotation 82 comes into next-adjacency with the loading slot 72L in the tray 72. The sensor 24 is positioned to view each cavity 74C through the opening 74H as the loading wheel 74 is rotated therepast. The sensor 24 verifies that the leading cavity 74C contains a tube T.

The loading of the rotor 12 is next discussed. As noted earlier the rotor 12 is assembled into the normally closed condition with the latches 46, 56 in the asserted (latched) state. Thus, a solid segment 32S' blocks the loading port 52P and the unloading port 40P. The rotor 12 is mounted on the shaft of the motor 26 and the motor 26 is moved to its home position. It will be recalled that in the home position of the motor 26 the loading port 52P in the cover 52 is vertically registered beneath the loading slot 72L in the tray 72 at the second angular position 58.

To load the core 32 the cover 52 is locked stationary to the axis VCL at the second angular position 58. To this end the solenoid of the second latch 56 is actuated causing the plunger 56P to extend into the latching opening 52R. However, since the first latch 46 is in the latched state (as an incident of the normally closed condition of the rotor 12) the core 32 and the floor 40 may move as a unit.

The core and floor plate unit is incrementally rotated by the motor 26 to bring an unfilled cavity 34 in the core 32 into registration beneath the loading port 52P in the now-stationary cover 52. The motor 78 is then stepped to rotate the loading wheel 74 to bring a sample container T disposed in the leading cavity 74C into registration with the loading slot 72L in the tray 72. As the motion of the loading wheel 74 brings the leading cavity 74C therein into registration with the slot 72L in the tray 72, the relative motion between the wheel 74 and the tray 72 causes the skirt 72S of the tray 72 to pass, trap-door fashion, from beneath the cavity 74C in the loading wheel 74. A sample container T falls by gravity from the cavity 74C in the loading wheel 74, through the slot 72L in the tray 72 and the loading port 52P in the cover 52 that is registered therebeneath, and into a sample-receiving cavity 34 in the core 32. This loading action is illustrated in the right hand sides of FIGS. 7 and 8. It should be noted that since the skirt 40S of the floor 40 closes the cavity 34 in the core 32, the container T is blocked from passing through the core 32.

The interdigitated sequence of rotation of the core-floor unit (by the motor 26) followed by the rotation of the wheel 74 (by the motor 78) continues until the desired number of sample-receiving cavities 34 in the core 32 have been filled by sample containers T dropped from cavities 74C in the wheel 74. It lies within the contemplation of the present invention to rotate the loading wheel 74 and the core 32 either simultaneously or in any other predetermined pattern of relative rotation.

The number of sample containers T being carried by the core 32 may be less than the total number of cavities 34 therein. In these instances, so as to maintain symmetrical weight balance of the rotor 12, the core 32 may be rotated to bring a selected cavity 34 to the second angular position 58 (beneath the loading slot 52P in the cover 52) before the wheel 74 is advanced in the direction of rotation 82. If it is desired to spin a rotor that is asymmetrically loaded (as with only a single sample tube), modifications to the rotor mounting structure would be required to allow the rotor to rotate about its center of mass rather than its center of geometry. This can be accomplished using a flexible rotor shaft, a pivoting rotor shaft, or by constraining the movement of the rotor drive shaft.

The instrument 10 is adapted to accommodate emergency conditions. With reference to FIG. 2, the magazine 76M-10 (that is, the magazine immediately past the angular position occupied by the slot 72L in the tray) may be designated as a "slat" position. This magazine may be left unloaded. Any container T requiring immediate attention may be placed in that magazine and supported on the surface of the wheel 74 lying therebeneath. When the core 32 is rotated by the motor 26 to bring an empty cavity 34 therein beneath the slot 72L and the port 52P registered therewith, the wheel 74 may be rotated by the motor 78 in a direction counter to the loading direction 82 (in the context of the present application, in a counter-clockwise direction). As the magazine 76M-10 registers with the slot 72L in the tray 72, the container T drops into the open cavity 34 in the core 32.

Prior to centrifugation the cover 52 is latched to the core 32 by de-actuating the solenoid to withdraw the plunger 56P from the latching recess 52R. The ball detent 56B again engages into the latching recess 52R thereby to latch the cover 52 to the core 32. The core 32, floor 40 and cover 52 are thus latched together as a rotatable rotor unit. The resulting rotatable rotor unit is then spun to effect centrifugation of the samples in the sample containers T carried in the core 32. Since the skirt 52S of the cover 52 overlies the top of the cavities 34 in the core 32 the sample containers received therein are constrained against centrifugal force during rotation of the rotor unit.

In the most preferred instance the rotor 12 includes both a floor 40 and a cover 52 respectively disposed below and above the core 32. It is noted that since each of the floor and cover 40, 52, respectively, exhibits a generally smooth outer surface thereon their presence on the core 32 minimizes windage while the rotor 12 is spun.

Subsequent to centrifugation sample containers T are unloaded from the core 32. To effect unloading the motor 26 is rotated to its home position. As a consequence the unloading port 40P in the floor 40 is located at the first angular position 48 and lies directly above the chute 50. The solenoid of the first latch 46 is actuated and the plunger 46P thereof extends toward the central portion 40C of the floor plate 40. The tip of the plunger 46P snaps into the latching recess 40L to urge the detent ball 46B from the latching recess 40L. The floor 40 is thus locked at the unloading position. The core 32 and the cover 52 remain latched and movable together as a unit.

The core and cover unit is then rotated in the direction 82. As each sample receiving cavity 34 in the core 32 is successively brought into registration with the port 40P the surface of the skirt 40S is removed, again in trap-door fashion, from beneath the cavity 34 in the core 32. A sample container T drops by gravity from a cavity 34 in the core 32, through the unloading port 40P in the floor 40, into the chute 50. This action is illustrated in the left hand side of both FIGS. 7 and 8. Each sample container T dropping into the chute 50 is deflected by the deflection plate 50D and directed toward the aperture 20A in the base 20. The deflection plate 50D in the chute 50 serves to change the orientation of the sample container T from its generally forty-five degree inclination (brought about by the orientation of the cavity 34 in the core 32) to an orientation generally parallel to the axis of rotation VCL. The container T is able to be received by the sample transport 30.

Since a suitable reader R is disposed along the path of transport of the containers (FIG. 1) it is not necessary that the position of the sample containers be monitored through the loading, centrifuging and unloading operations.

Although the loading and unloading of the core 32 have been described as separate operations it may be appreciated that loading and unloading of the core can be effected simultaneously, thus increasing the throughput of the instrument. To combine these operations the floor 40 is locked at its unloading position (the angular position 48) and the cover 52 is simultaneously locked at its loading position (the angular position 58). The core 32 alone is advanced by the motor 26 to bring a cavity 34 therein over the unloading port 40P while another cavity 34 therein is brought beneath the loading port 52P.

In view of the foregoing, those skilled in the art may readily appreciate that the present invention uses the force of gravity both to load sample containers into cavities 34 in the core 32 through a loading port 52P in the cover 52 thereof and later to unload the sample containers through an unloading port 40P provided in floor 40, again using the force of gravity.

FIGS. 9 through 19 illustrate an instrument and a rotor for use therein in accordance with an alternate embodiment of the present invention. The same reference numerals accorded to elements as described in connection with FIGS. 1 through 8 are used to refer to identical elements in the following discussion, while elements that have been modified in accordance with the alternate embodiment are designated by the reference numeral of the corresponding part as shown in FIGS. 1 through 8 prefixed by the character "1". Elements that are added to the structure in accordance with the alternate embodiment are likewise indicated by a reference numeral with the prefix "1". Thus, for example, the instrument in accordance with the modified embodiment is generally indicated by the reference character 110, with the modified rotor therefor being indicated by the reference character 112.

The primary modifications to the instrument 110 shown in FIGS. 9 through 19 include an alternate loading arrangement, generally indicated by the reference character 170, for automatically loading a plurality of sample containers T into the rotor 112, as well as various alterations to the structure of the rotor core 132 and its associated cover 152. The changes to the rotor core 132 and its associated cover 152 are first discussed.

As may be best seen from FIGS. 9 through 11 and 13, the disposition of each sample container-receiving cavity 134 within the core 132 differs from the disposition of the cavities 34 within the core 32 as hereinbefore set forth. In accordance with this embodiment of the invention each cavity 134 again extends completely through the core 132. However, instead of each cavity 134 interrupting the entry surface defined by the upper surface of the frustoconical portion 132F of the core 132, the inner boundary wall 134N of each cavity is inclined with respect to the axis of rotation VCL such that the mouth 134M of each cavity 134 interrupts the cylindrical central portion 132C of the core 132. In effect, the cylindrical central portion 132C thus defines the entry surface of the core 132, while the undersurface of the frustoconical portion 132F continues to define the removal surface of the core 132. It is noted that since in the alternate embodiment of the invention the mouth 134M of each cavity 134 interrupts the central portion 134C, the upper surface of the frustoconical portion 132F of the core 132 may, if desired or convenient, be left uninterrupted, thereby effectively closing the upper margin of the cavity 134 that lies beneath the cover 152.

Figure 11:
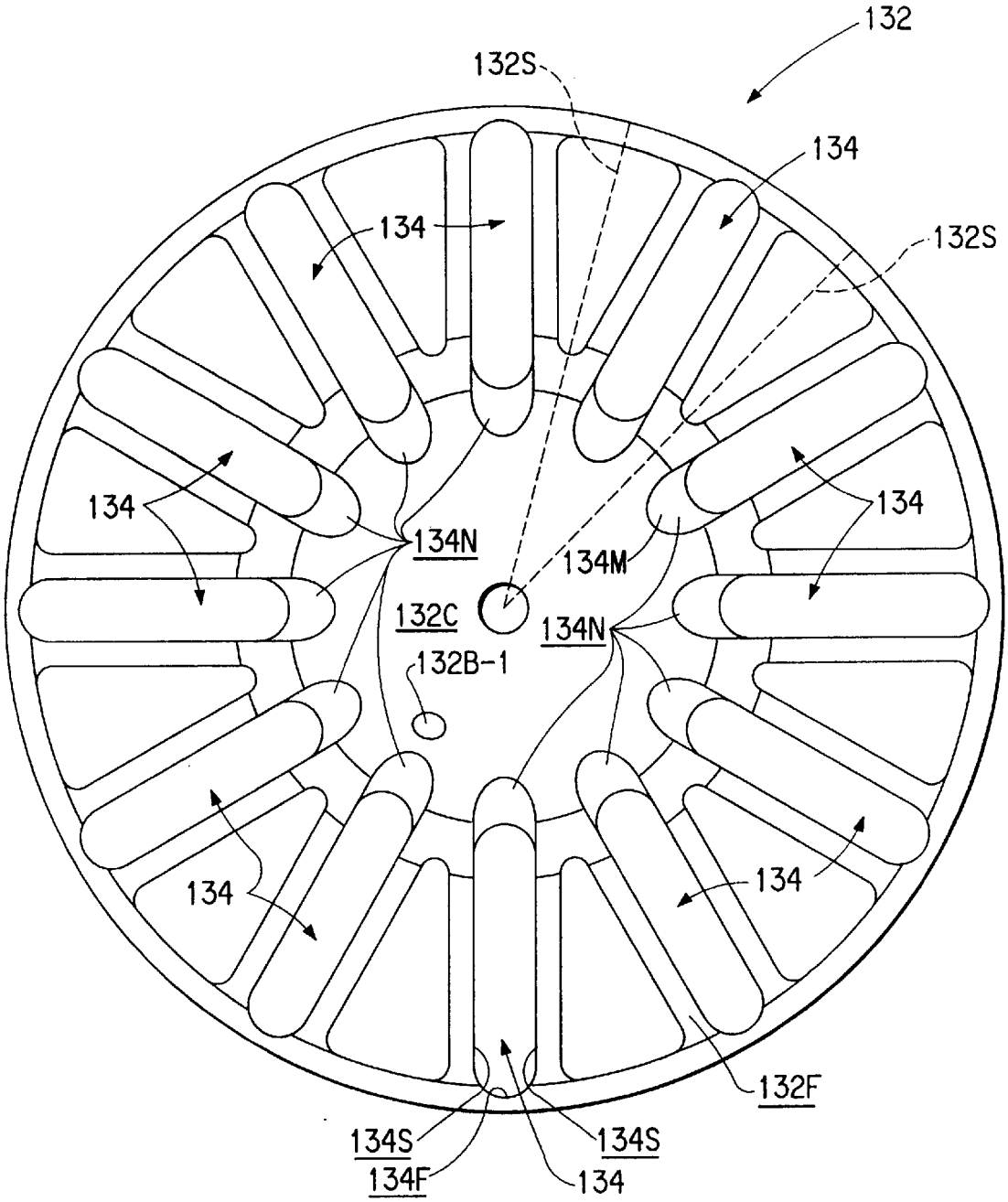
FIGS. 11 and 12 are, respectively, plan views of the rotor core and rotor cover shown in FIGS. 9 and 10.

To limit the weight of the rotor 112 the material of the frustoconical portion 132F of the core 132 may be removed from the regions between adjacent cavities 134. A core 132 having material removed therefrom is illustrated in FIG. 11. Similar to the case in the earlier discussed embodiment, if desired, all of the segments 132S of the core 132 need not contain a cavity 134.

In the same manner as discussed in connection with FIGS. 1 through 8 the core 132 and the floor 40 may be latched together by the first latch 46 to be movable together as a unit. When unlatched the core 132 is rotatably movable with respect to the floor 40. For clarity of illustration the first latch 46 and the associated bore 32B-1 provided in the core 132 are omitted from FIG. 9.

Figure 10:
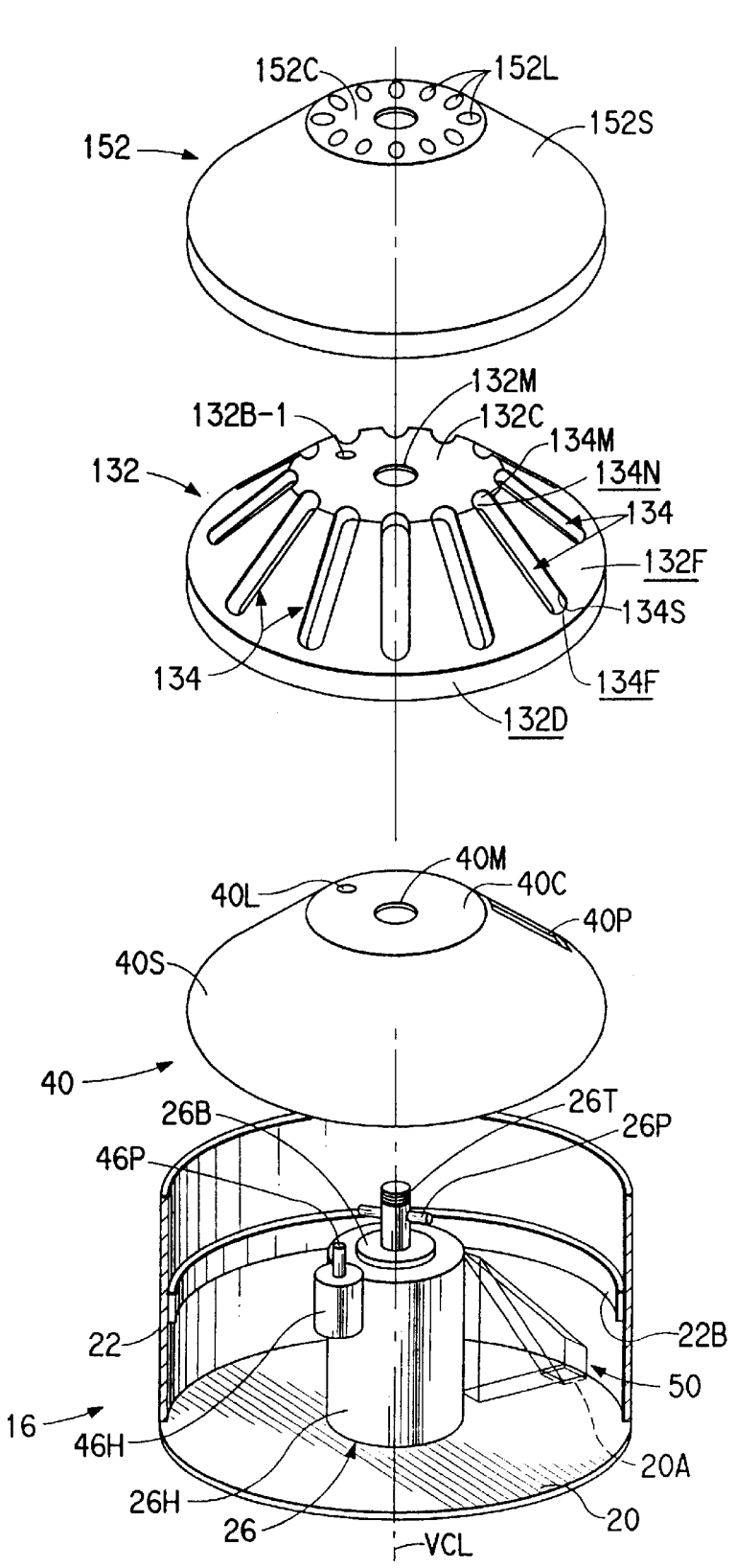
FIG. 10 is an exploded view showing in perspective the various components of the instrument of FIG. 9.
Figure 12:
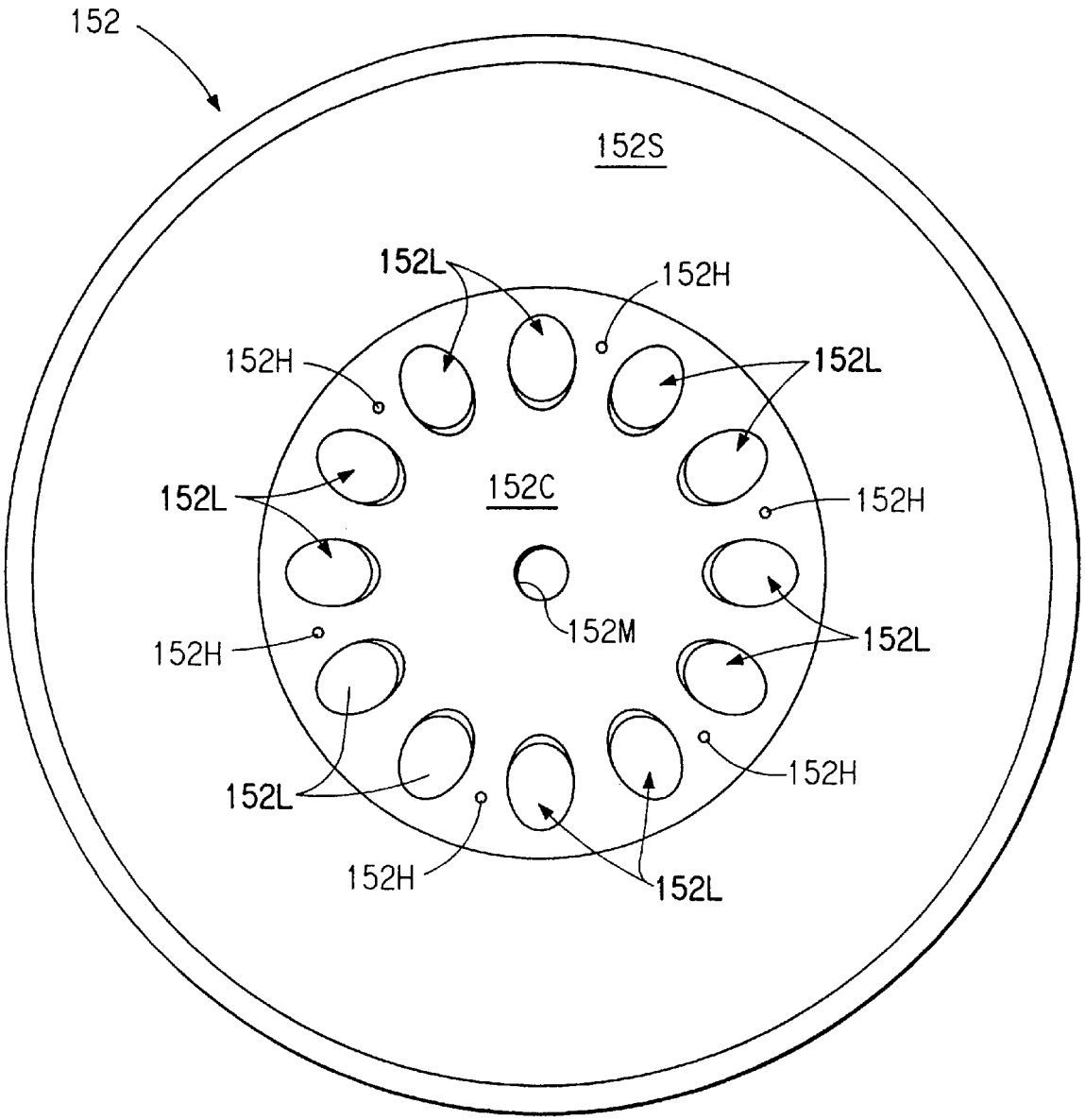
Figure 13:
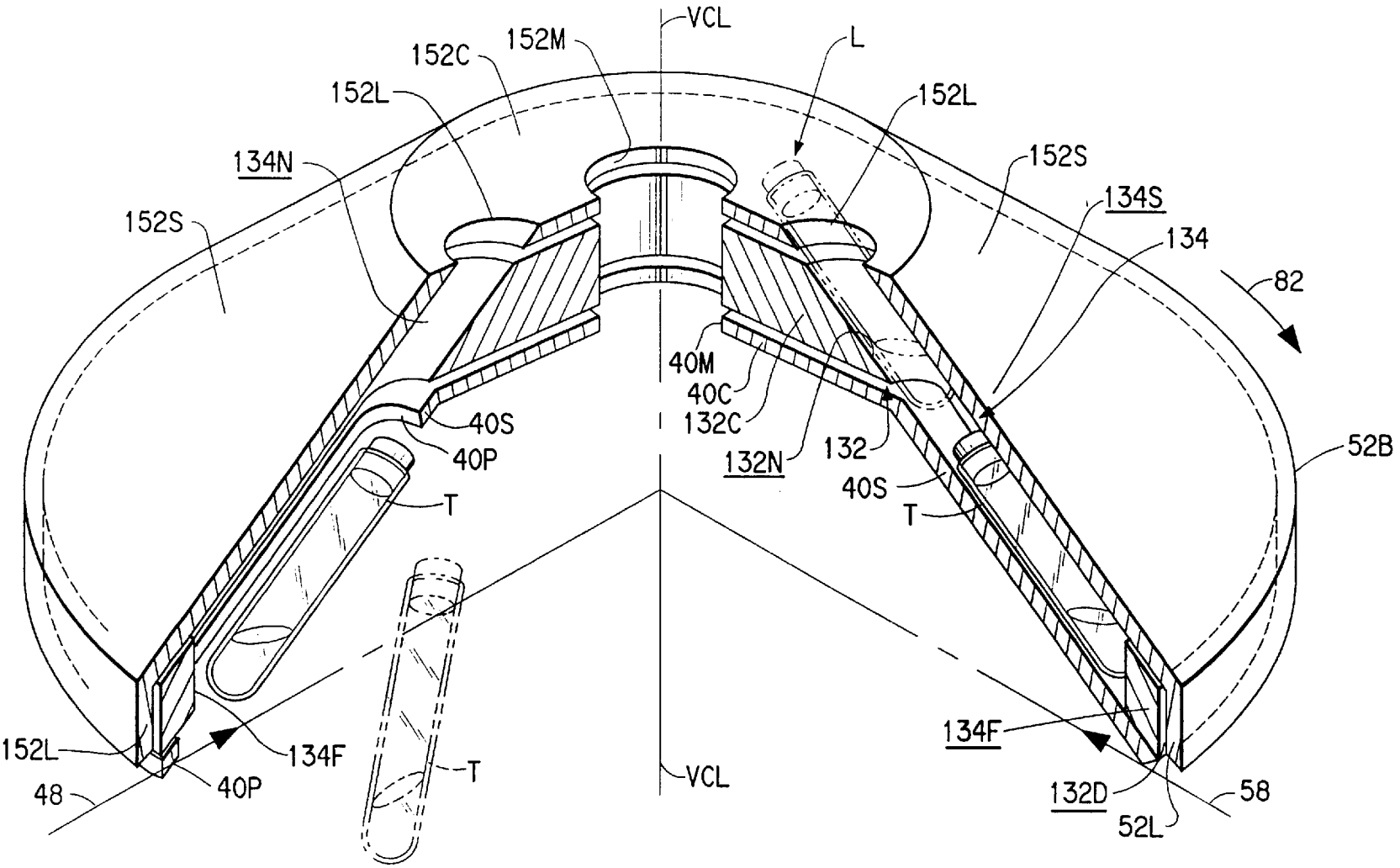
FIG. 13 is an isolated perspective view of the rotor shown in FIG. 9 with a portion thereof cut away to illustrate the simultaneous loading and unloading of sample containers into and from the rotor.
Figure 15A:
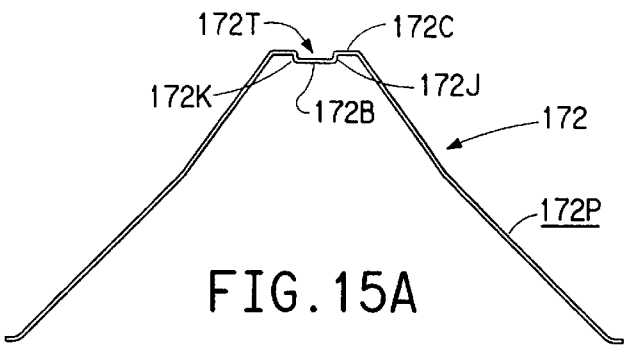
FIGS. 15A through 15C are side elevation views taken along respective section lines 15A—15A, 15B—15B and 15C—15C shown on FIG. 14.
Figure 15B:
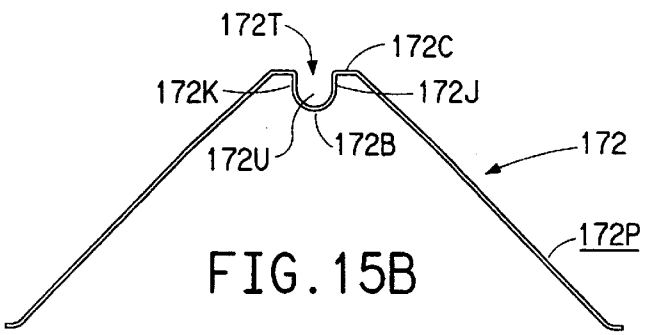
Figure 15C:
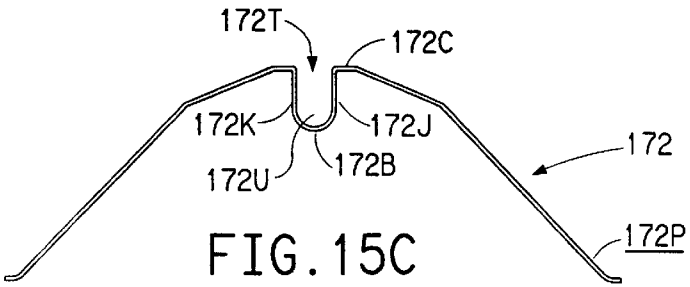
Figure 14:
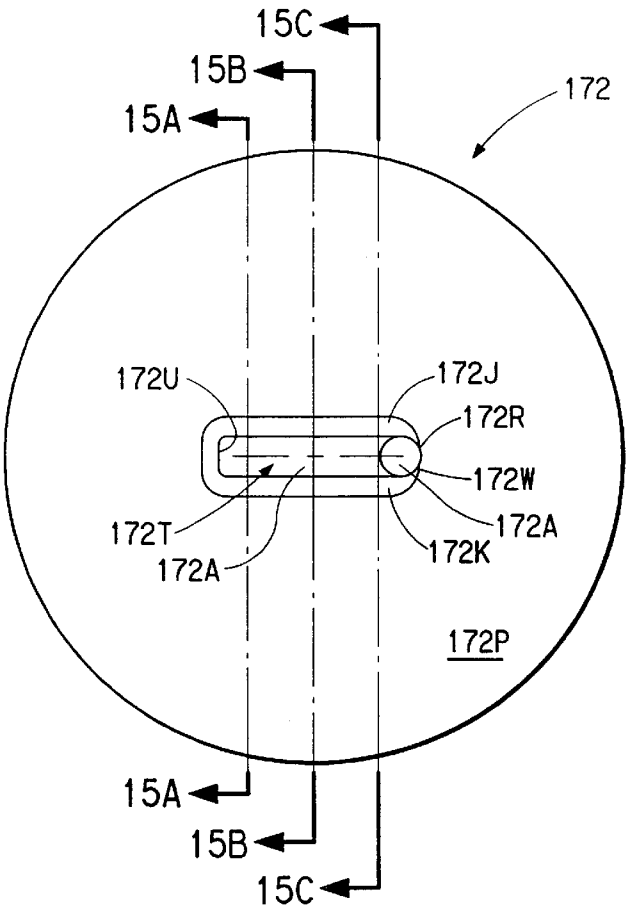
FIG. 14 is a plan view of a loading tray used with the embodiment of the invention shown in FIG. 9.
Figure 16:
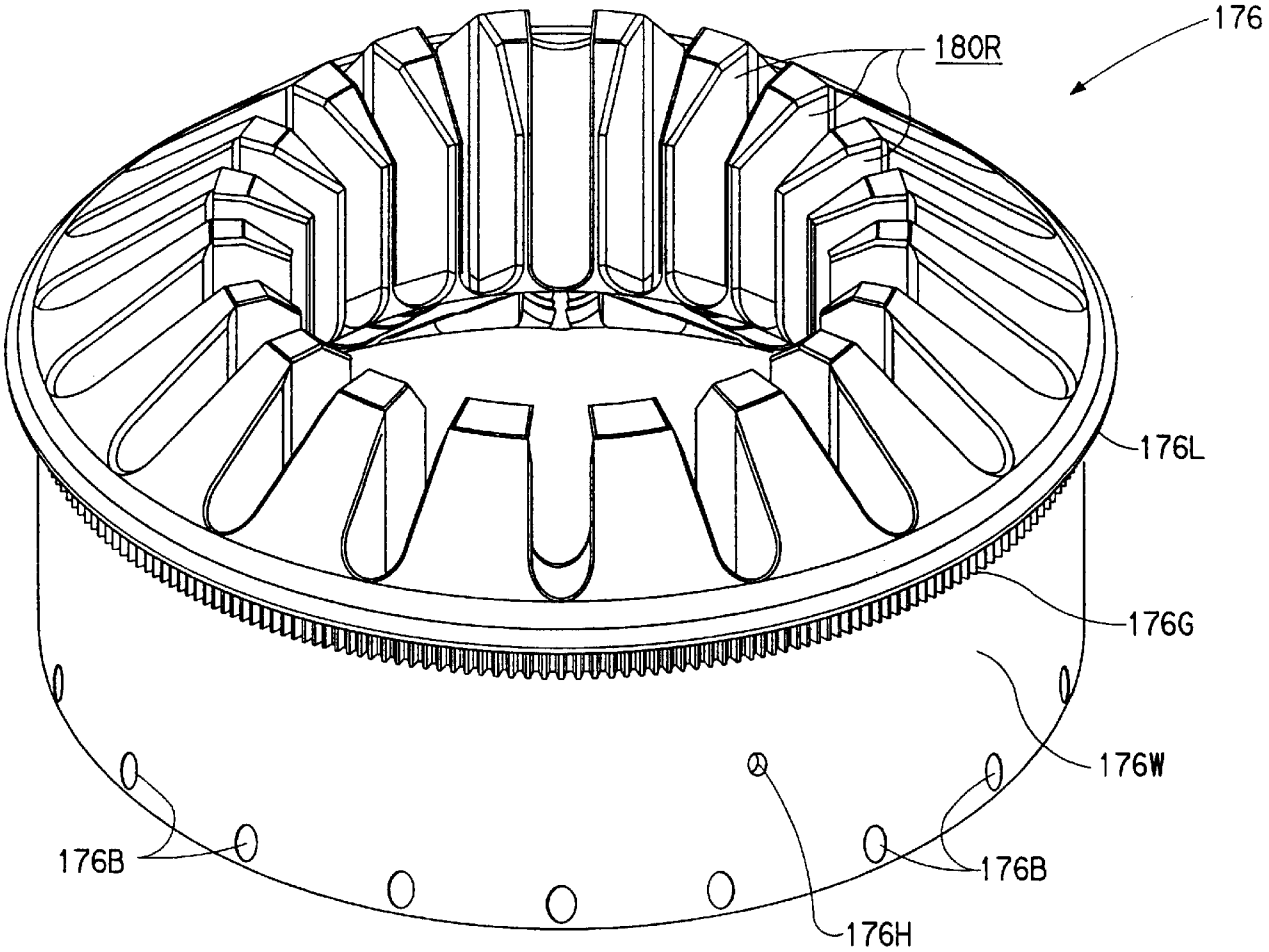
FIG. 16 is a perspective view of a magazine member shown in the embodiment of the invention illustrated in FIG. 9.
Figure 17:
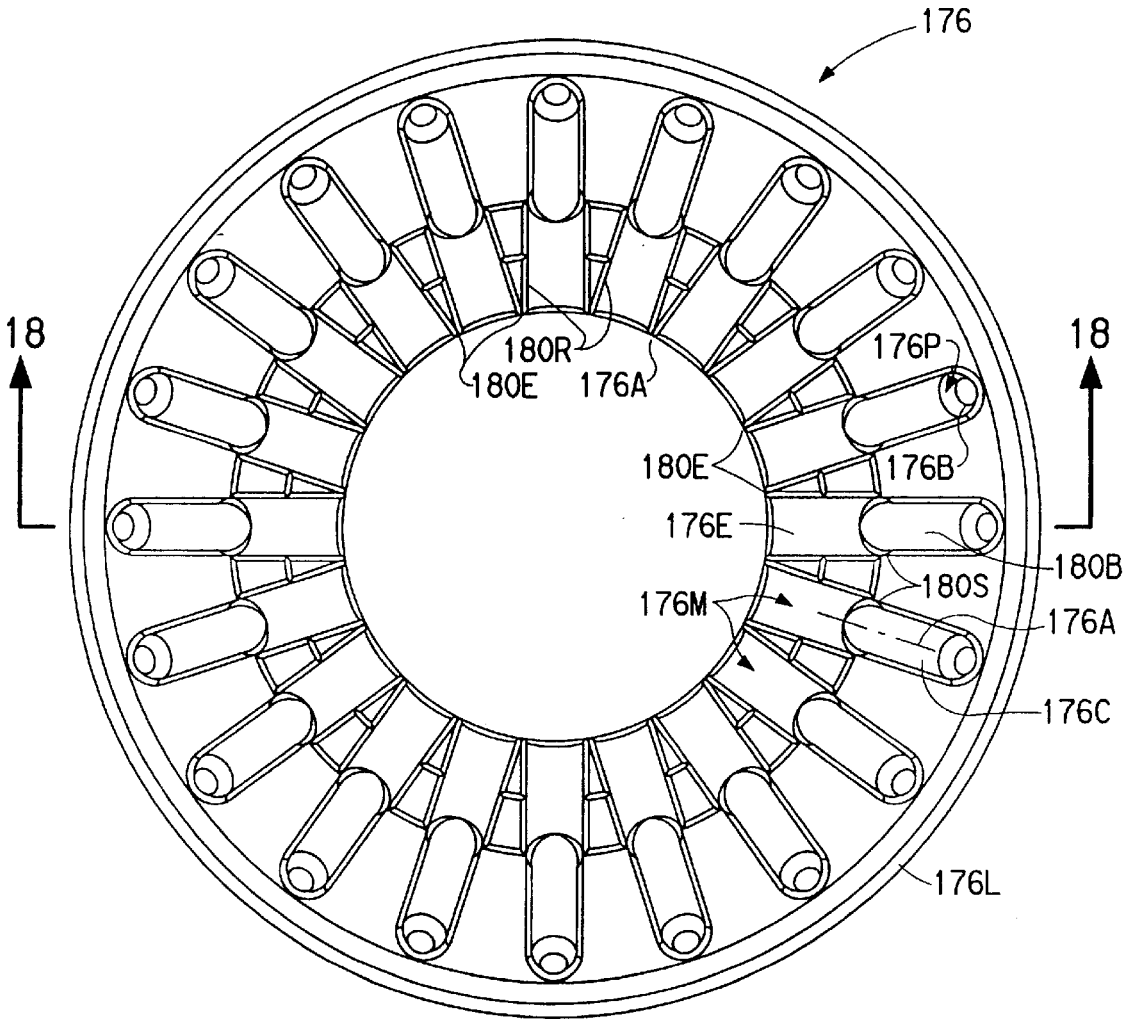
FIG. 17 is a plan view of the magazine member of FIG. 16.
Figure 18:
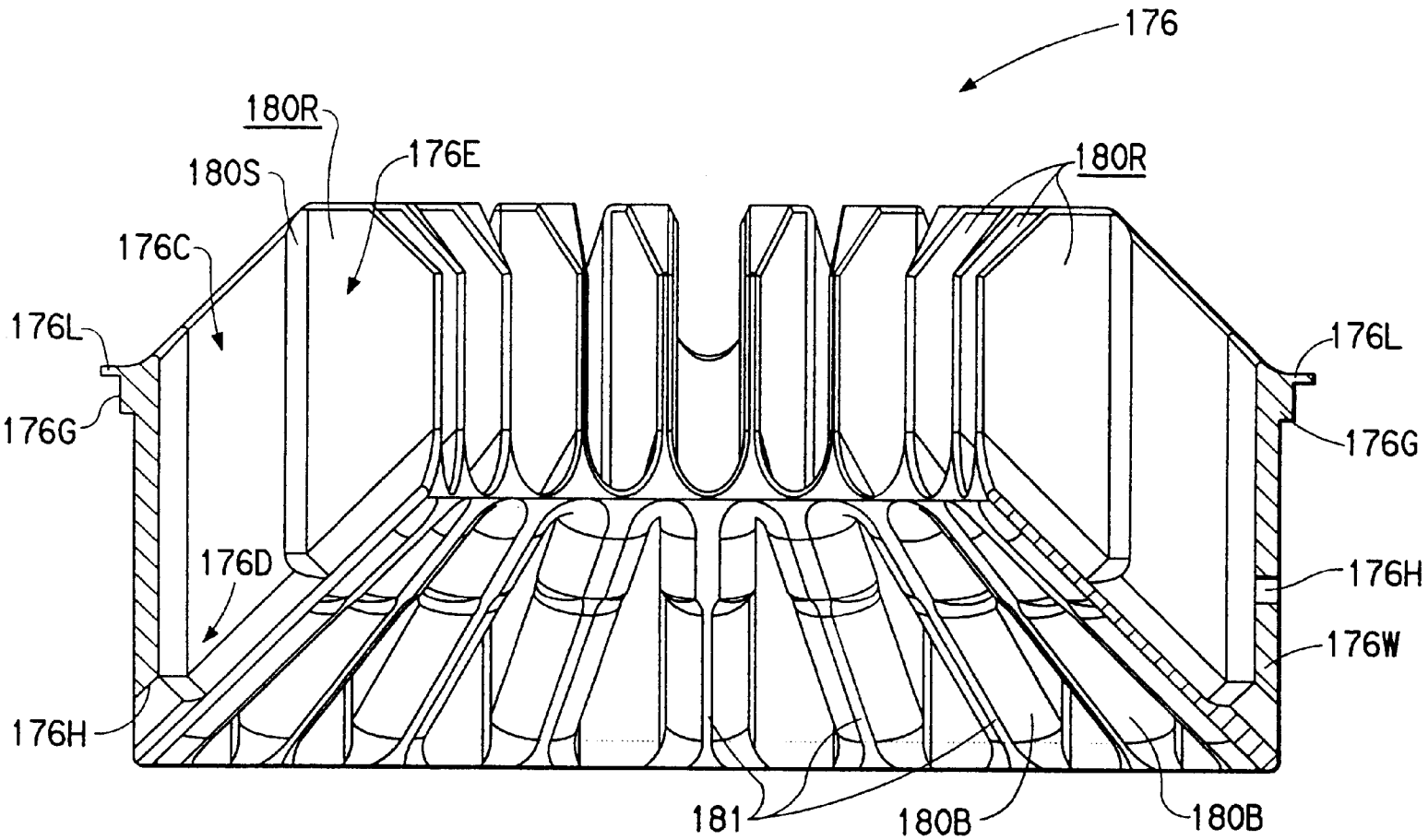
FIG. 18 is a side sectional view taken along section lines 18—18 in FIG. 17.
Figure 19:
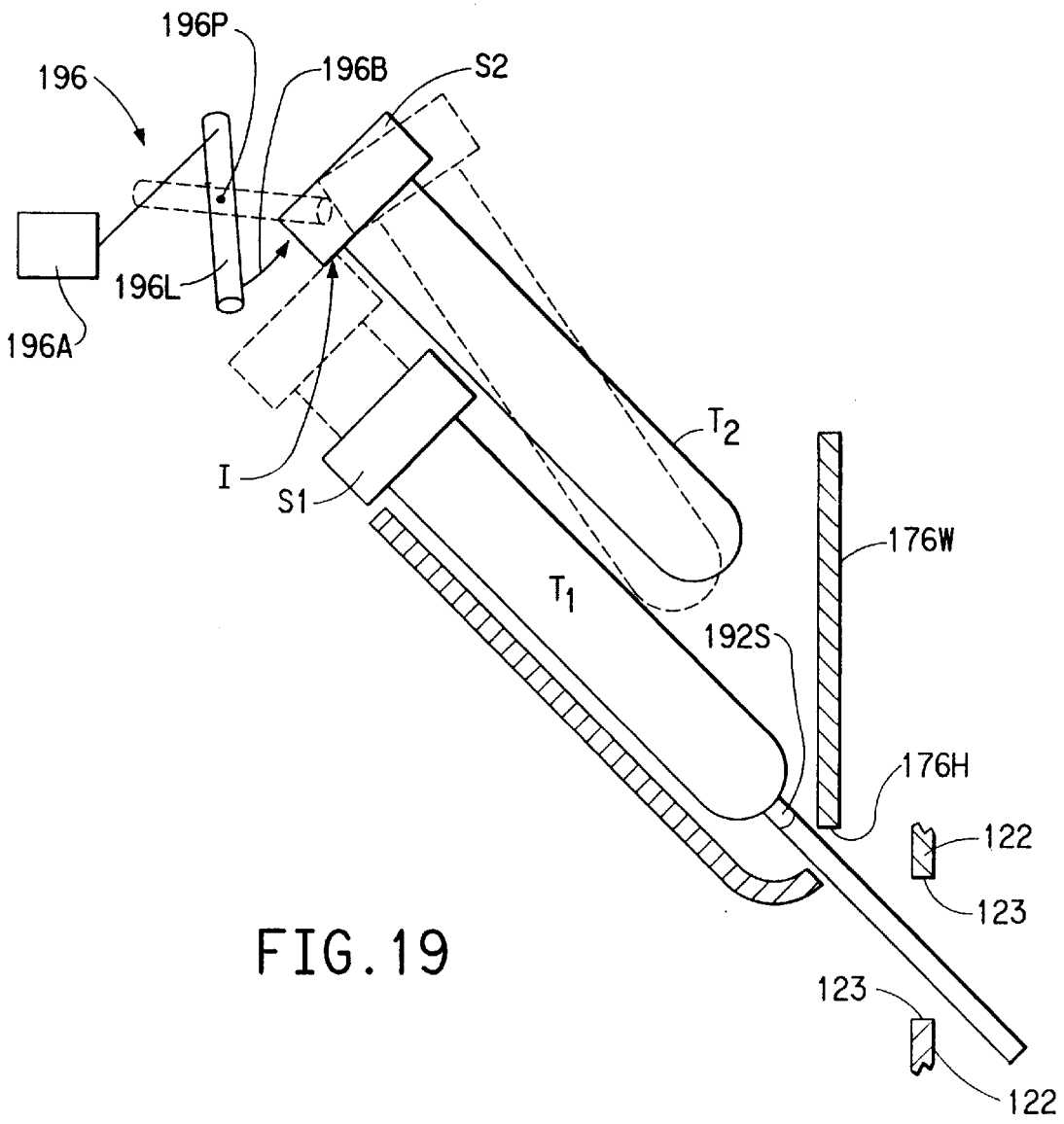
FIG. 19 is a stylized pictorial representation of a tube lifting arrangement.

A cover 152, best seen in FIGS. 10, 12 and 13, includes a central portion 152C and a frustoconical skirt 152S. In the embodiment of these FIGS., the cover 152 is secured in non-rotational relationship with respect to the core 132 by any suitable attachment mechanism, such as screws (not shown) that extend through holes 152H (FIG. 12). The loading port 52P (FIGS. 3, 4B) disposed through the skirt 52S of the cover 52 of the earlier discussed embodiment is omitted in the embodiment here under discussion. Instead, access to the cavities 134 formed in the core 132 is afforded through an array of loading ports 152L. The ports 152L are located in a generally circular array in the central portion 152C of the cover 152. Each port 152L is located at an angular position in correspondence to one of the cavities 134 in the core 132 such that each one of the ports 152L axially aligns with the mouth 134M of a respective cavity 134 in the core 132. The loading ports 152L are preferably elliptical in shape and have a minor diameter that is greater than the diameter of the presently available forms of sample tubes T. The loading ports 152L may be formed by drilling at a forty five degree angle relative to the plane surface of cylindrical center portion 152C using a drill of diameter about three fourths of an inch in diameter.

Since the cover 152 is physically secured to the core 132 and is non-rotatably movable with respect thereto the second latch element 56 (FIGS. 6A, 6B) is eliminated. Accordingly, the second bore 32B-2 in the periphery of the core 32, the recess 52R in the lip 52L of the cover 52, and the aperture 22A (FIG. 1) may also be omitted.

The alternate form of sample container loading arrangement 170 includes a stationary loading tray 172 disposed between rotor 112 and a sample container magazine member 176 to be described. The loading tray is itself illustrated in FIGS. 9, 14 and 15A through 15C. The loading tray 172 is fixedly secured on the mounting band 22B provided on the interior of the sidewall 22 in a manner similar to the securement of the loading tray 72.

As seen from FIGS. 9 and 15A through 15C the peripheral portion 172P of the tray 172 is generally frustoconical in shape, having an inclination of about forty-five degrees with respect to its vertical center line. The central region 172C of the tray 172 has an inclined, generally cylindrical, depression, or trough, 172T formed therein. The trough 172T has a reference axis 172A defined therein. The trough 172T is formed by confronting sidewalls 172K, 172J, an axially inclining bottom 172B, and upper and lower end walls 172U, 172W. As seen from FIGS. 15A, 15B and 15C, the trough 104 progressively increases in depth (measured with respect to the axis VCL) as one progresses from the upper end walls 172U toward lower end wall 172W. The lower end wall 172W has an opening 172A therein. As will be developed the trough 172T is sized to accept stoppered sample tubes T that are introduced thereinto over the ridge 172R defined between the end wall 172W and the peripheral portion 172P. In the preferred instance the tray 172 is fabricated from a vacuum formable sheet (approximately one-eighth inch thick) of a thermoplastic material that has a low coefficient of sliding friction and present a low resistance to movement of a sample tube T along its surface. Suitable for use as the material of the tray is the thermoplastic material manufactured and sold by Kleerdex of Mt. Laurel, N.J., under the trademark Kydex®.

Figure 9:
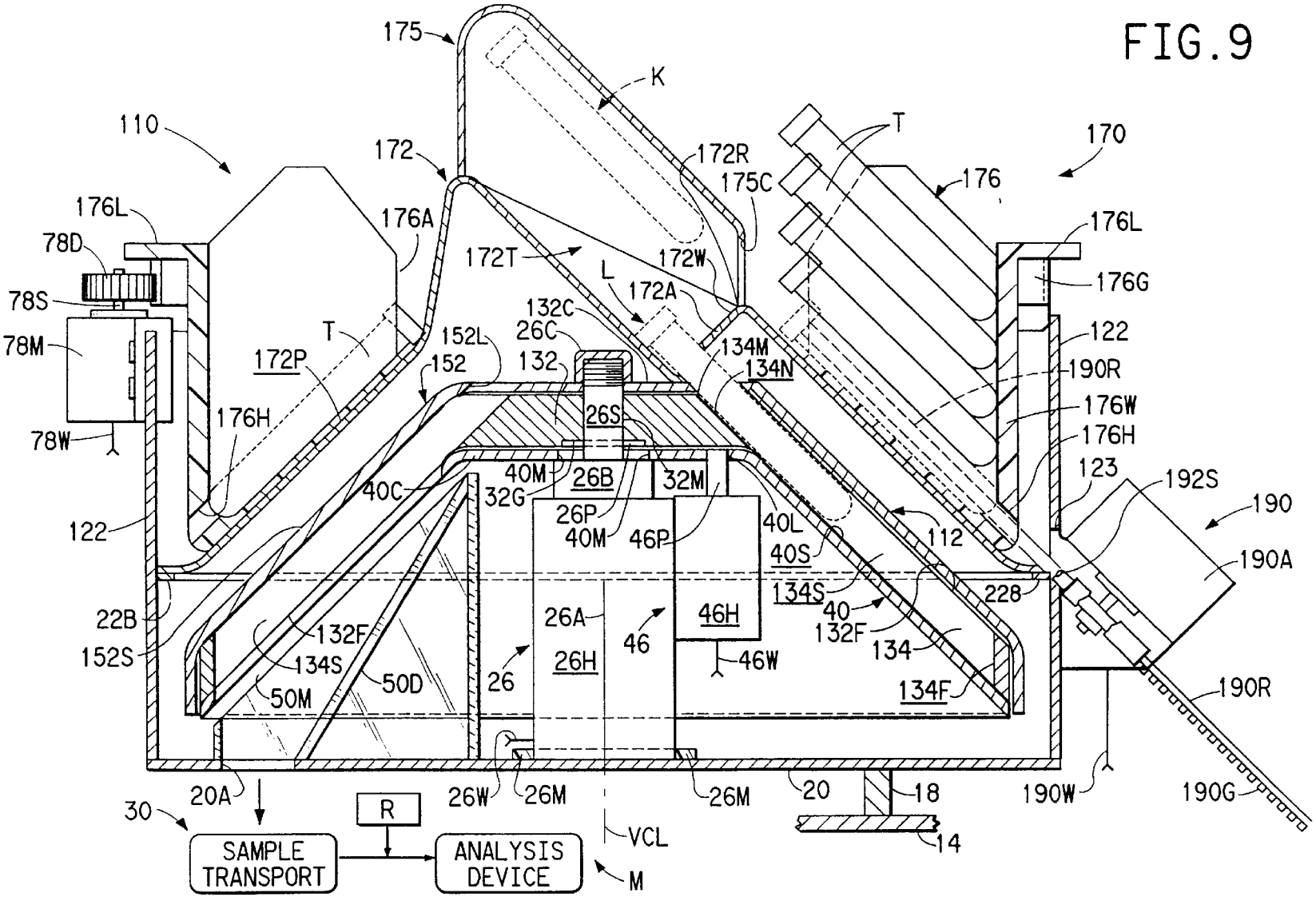
FIG. 9 is a side elevation view entirely in section illustrating an instrument having an alternate form of rotor and sample container loading arrangement inaccordance with the present invention.

As shown in FIG. 9, a cap 175 may be secured to tray 172 to enclose the trough 172T. The cap 175 has a circular opening 175C therein to allow passage of sample tubes T into the trough 172T. The cap 175 serves to prevent any foreign object from passing into the trough 172T and/or through the opening 172A into the instrument.

The alternate form of sample container loading arrangement 170 further includes a magazine member 176 that replaces the combination of the loading wheel 74 and the magazine 76 (FIGS. 1, 7) of the embodiment set forth in connection with FIGS. 1 through 8.

As is best seen from FIGS. 9, 16 through 18, the magazine member 176 is a generally annular, wheel-like member having a central opening 176A therein. The magazine member 176 is received on and supported by the surface of the peripheral portion 172P of the tray 172 for rotatable movement with respect thereto. When the magazine 176 is received on the tray 172, the trough 172T defined in the central region 172C of the tray 172 is disposed within the opening 176A in the magazine member 176. In the preferred instance, the magazine member 176 is fabricated by structural foam molding from a polycarbonate material.

The magazine member 176 has a smooth, generally cylindrical outer sidewall 176W, the upper edge of which defines a lip 176L. A gear rack 176G (similar to the gear ring 74G) extends about periphery of the upper margin of the outer sidewall 176W beneath the lip 176L. As seen in FIG. 9, as the magazine member 176 is received on the tray 172, the upper edge of the outer sidewall 176W is presented above the edge of the sidewall 122 of the instrument 110 so as to matedly engage with the drive gear 78D on the motor 78M. The sidewall 22 differs from that shown in connection with the earlier discussed embodiment in the provision of an aperture 123 for a purpose to be discussed.

An array of spoke-like walls 180R extend radially inwardly from the inner surface of the wall 176W. The locus of the vertically oriented inner edges 180E of the radial walls 180R define the central opening 176C of the magazine member 176. The lower edges of adjacent radial walls 180R (FIG. 18) are connected by curved bottom walls 180B. The bottom walls 180B are inclined to correspond to the angle of inclination of the surface 172P of the tray 172. A portion of the undersurface of the curved bottom walls 180B is flattened, as at 181, to define bearing surfaces on which the magazine member 176 may slide over the planar surface of the peripheral portion 172P of the tray 172. The confronting radially extending surfaces of adjacent radial walls 180W, together with the curved bottom wall 180B therebetween, cooperate to define an array of generally radially extending, inclined magazines 176M surrounding the central opening 176A in the magazine member. Each radial sidewall 180W has, approximately radially midway therealong, a vertical shoulder 180S that extends circumferentially inwardly toward its corresponding confronting sidewall. The shoulders 180S serve to define within the volume of each magazine 176M a radially inwardly disposed, relatively circumferentially enlarged region 176E of each magazine 176M and a radially outwardly disposed, relatively circumferentially narrower region 176C. Each magazine 176M has a reference axis 176A that extends therethrough in a generally radial direction (with respect to the axis VCL).

In each magazine 176M the portion of the radially outer walls 180W and the curved bottom wall 180W in the vicinity of their junction are shaped so as to cooperatively define a rounded pocket 176P that is able to accommodate the rounded end of a sample tube T. The central portion of the pocket 176P is interrupted by a bore 176B that extends through the outer sidewall 176W for a purpose to be described. As the magazine member 176 is rotated the bores 176B therein pass into axial alignment with the aperture 123 provided in the sidewall 22 of the instrument 110. The sidewall 176W has an opening 176H therein. The opening 176H receives a magnet (not shown) which cooperates with a sensor (as a Hall Effect device, also not shown) to generate a signal representative of the position of the magazine 176 with respect to the aligned axes of the trough 172T and a loading apparatus 190 to be discussed. The sensor may be conveniently mounted within the instrument 110.

The embodiment of the invention shown in FIGS. 9 through 19 further includes a sample tube loading apparatus 190 for loading containers carried by the magazine member 176 into the rotor 112. The loading apparatus 190 comprises a loading rod 190R and an associated actuator 190A therefor. The actuator 190A is connected over a line 190W to the instrument control network 28 (not shown in FIG. 9). In the preferred instance the actuator 190A takes the form of a stepper motor, such as that manufactured and sold by Oriental Motors, Fairfield, N.J., as model PK245022A Loading rod 190R is preferably made of stainless steel and has a rack gear 190G lengthwise disposed thereon. In the assembled condition shown in FIG. 9 the axis of the loading rod 190R aligns parallel to the reference axis 172L of the trough 172T. The rack gear 190G is interfaced in conventional manner with a spur gear 190S mounted on the shaft of the stepper motor 190A. Tube loading apparatus 190 is mounted in fixed relationship to the exterior of the sidewall 122 of the instrument 110 so that, in operation, the stroke of the loading rod 190R is parallel to the longitudinal axes of sample tubes T positioned in magazine member 176 as the rod 190R moves from the retracted position (shown in solid lines in FIG. 9) to its extended position (shown in dot-dash lines in FIG. 9). The rod 190R is diametrically sized so that it may move through aperture 123 provided in the sidewall 22 of the instrument 110 and through each bore 176B in the sidewall 176W of the magazine 176. In the preferred case a sensor 192S is disposed, for a purpose to be described, at the leading end of the loading rod 190R. A signal representative of the sensor output is applied to the instrument control network 28.

Operation

The mode of operation of the alternate embodiment of the invention shown in FIGS. 9 through 20 whereby a plurality of sample containers T is automatically loaded into the rotor 112 may now be described.

Similar to magazine member 76 earlier described before, the magazine member 176 is provided with a supply of sample containers T in some or all of the magazines 176M. The containers T may be randomly located among the magazines 176M. The tubes T are preferably loaded such that the stoppered end thereof is received in the relatively circumferentially enlarged region 176E of a magazine 176M, while the body of the tube T is received in the relatively circumferentially narrower region 176N, as suggested in FIG. 9.

With the rotor 112 in its normally closed position as described hereinbefore, the rotor 112 unit formed by the core 132 (with the cover 152 secured thereto) and the floor 40 may be incrementally rotated by the motor 26 to bring an empty cavity 134 in the core 132 and a loading port 152L in cover 152 registered therewith into alignment with the opening 172A in lower wall 172W of the trough 172T. The position of the magazine 176 is determined by use of the magnet in the opening 176H (FIG. 18) and the sensor cooperative therewith, as discussed above. The motor 78M may be stepped sequentially (or simultaneously with the motor 26) to rotate the magazine member 176 to bring the axis 176L of a selected magazine 176M into radial alignment with the axis 172L of the trough 172T. This action thereby brings the axis of a sample container T carried in the pocket 176P of the selected magazine 176M into registration with the axis 172L of the trough 172T. Movement of the magazine member 176 as described also disposes the bore 176B in outer sidewall 176W of the selected magazine into registration with the opening 123 in the sidewall 22 of the instrument 110. The sensor 192S at the end of the loading rod 190R serves to detect the presence of a sample tube T in selected magazine. If no sample tube is detected, the motor 78M is repeated stepped until a magazine 176M brought into radial alignment with the axis 172L of the trough 172T is determined to contain a sample tube T.

Stepping motor 190A is activated by a control signal from the instrument control network 28 over the line 190W to cause the loading rod 190R to displace radially inwardly from its retracted toward its extended position shown in dot dash lines in FIG. 9. As it displaces toward its extended position, the loading rod 190R extends through the opening 123 and the bore 176B registered therewith. The continued displacement of the loading rod 190R toward its extended position causes the rod 190R to engage the lower portion of the sample tube T received in the pocket 176P of the selected magazine 176M. As the rod 190R extends the sample tube T is accelerated and its momentum carries the tube T along a ballistic path (in a "kicked" fashion) radially inwardly and upwardly, over the ridge 172R, into the trough 172T as suggested at reference character 9 in FIG. 9. The tube T is urged by gravity downwardly and radially outwardly along the surface of the bottom wall 172B of the trough 172T, and the through the opening 172A in lower sidewall 172W of the trough 172T as suggested at reference character L in FIGS. 9 and 13. A second sample tube T carried in the selected magazine 176M above the first discussed tube then drops into the pocket 176P.

The sample tube T thereafter drops by gravity through elliptically shaped loading port 152L in the cover 152, and then into the sample-receiving cavity 134 in the core 132. The positions of a sample tube T as it progress from its position of repose within the magazine 176M to its position of repose within the rotor 112 is collectively illustrated in phantom in FIGS. 9 and 13. The loading rod 190R is returned to its retracted position.

After a first sample tube T is loaded into an empty cavity 134, rotor 112 is incrementally rotated again by motor 26 to bring another empty cavity 134 in the core 132 into registration with the opening 172A in trough 172. Another sample tube T may then be loaded into the cavity 134. The second sample tube may be obtained either from the same selected magazine 176M or from a different magazine 176M that has been rotated into position by the motor 78. The second tube is displaced from its position of repose into the trough 172T by the extension of the rod 190R, as discussed above. The loading process is repeated until a sample tube T is loaded into the desired number of cavities 134 until no more further sample tubes T remain in the magazine member 176. During this loading process, if less than all of the cavities 134 are filled, then the rotor 112 should be loaded in a way that maintains symmetrical weight balance, as previously described herein.

Subsequent to centrifugation, sample containers T are unloaded from the core 132 in the same manner as described in connection with the earlier embodiment, by bringing a cavity 134 into registration with the port 40P and removing the surface of the skirt 40S in trapdoor fashion from beneath the cavity. The sample container T drops by gravity from cavity 134 through the unloading port 40P in the floor 40 into the chute 50 and therefrom into sample transport 30. The unloading of a cavity 134 is suggested in the left-hand side of FIG. 13.

In some instances the ejection of the lowermost tube T in a magazine 176M may be hindered by interference between the stopper S1 of the lowermost tube T1 in the magazine and the stopper S2 of the tube T2 disposed next-thereabove. This interference is illustrated at reference character I in FIG. 19. To avoid this eventuality a tube lifting arrangement 196 may be mounted in any convenient position on the magazine member 176 or on the tray 172 (as, for example, to the cap 175 if provided). The tube lifting arrangement 196 includes a lifting rod 196L that is mounted for pivotal motion about an axis 196P in response to an actuating force imposed by a actuator 196A, such as a solenoid. The free end of the lifting rod 196L carries a proximity sensor 196S. The sensor 196S is operative to detect the approach theretoward of a tube T1 being ejected by the rod 190L. In response to a signal generated by the sensor 196S the actuator 196A causes the rod 196L to pivot in the direction of the arrow 196B, causing to the rod 196L to move into lifting engagement with the stopper S2 of the interfering tube T2, thereby lifting the tube T2. This lifting action is illustrated in dotted lines in FIG. 19.

Those skilled in the art, having the benefit of the teachings of the present invention as herein above set forth, may effect numerous modifications thereto. Such modifications are to be construed as lying within the contemplation of the present invention, as defined by the appended claims.

What is claimed is:

[1. A centrifuge rotor for rotating a sample container about an axis of rotation, the rotor comprising:

a core having at least one container-receiving cavity extending completely therethrough, the core comprising:

a generally cylindrical central portion having a core mounting aperture therethrough, and a generally frustoconical radially outward portion, the container-receiving cavity being disposed in the generally frustoconical radially outward portion;

a floor, the floor and the core being positioned relative to each other so that, unless inhibited by the floor a container receivable within the cavity in the core would drop by gravity therefrom, the floor and the core being movable together as a unit and also being movable with respect to each other from a closed position to an open position, in the closed position the floor at least partially closes the cavity in the core to inhibit a container receivable within the core from dropping from the core in response to gravity, while in the open position the container receivable within the cavity responds to gravity to drop from the core;

a first latch system for selectably latching the floor and the core to maintain the core and the floor in the closed position.]

2. The centrifuge rotor of claim [2] *24* further comprising:

a cover having a loading port therethrough, the cover and the core being movable with respect to each other to a loading position in which the loading port registers with the cavity in the core; and a second latch system for selectably latching the cover and the core.

3. The centrifuge rotor of claim [1] *24* wherein the floor comprises:

a generally cylindrical central portion having a floor mounting aperture therethrough, and a generally frustoconical radially outward skirt portion, the skirt portion having the unloading port formed therethrough, the cylindrical portion of the floor and the cylindrical portion of the core being arranged such that the mounting apertures in the floor and in the core register axially with each other, wherein the first latch system is disposed in the cylindrical portions of the floor and the core.

4. The centrifuge rotor of claim 3 wherein the first latch system comprises:

a recess formed in the central portion of the core, a latching opening in the central portion of the floor, the recess and the latching opening registering with each other, a latching member received in the recess such that a portion thereof extends into and is received by the latching opening in the floor, thereby to latch the floor to the core; and a plunger extensible to engage the portion of the latching member received by the latching opening in the floor and to urge the portion of the latching member therefrom, thereby to unlatch the floor from the core.

5. The centrifuge rotor of claim [1] *24* wherein the container-receiving cavity in the core having radially inner and radially outer boundary walls, the boundary walls being disposed parallel to the axis of rotation.

6. The centrifuge rotor of claim [1] *24* wherein the core has a surface thereon, the surface of the core being subdivisible into a plurality of segments, the surface of some of the plurality of segments being interrupted by a sample container-receiving cavity that extends through the core while the surface of others of the segments is uninterrupted, some of the cavities being angularly spaced from an adjacent cavity by a first angular distance while others of the cavities are angularly spaced from an adjacent cavity by a second angular distance, the greater angular distance encompassing an uninterrupted surface of a segment of the core.

7. The centrifuge rotor of claim 6 wherein the core includes at least two uninterrupted segments that are diametrically opposed to each other.

8. The centrifuge rotor of claim [1] *24* wherein the cover comprises:

a generally cylindrical central portion having a cover mounting aperture therein; and a generally frustoconical radially outward skirt portion, an annular lip depending from the skirt portion, the skirt portion having the loading port formed therein.

9. The centrifuge rotor of claim 8 wherein the core comprises:

a generally cylindrical central portion having a core mounting aperture therethrough; and a generally frustoconical radially outward portion, the container-receiving cavity being disposed in the generally frustoconical radially outward portion, the cylindrical central portion of the cover and the cylindrical central portion of the core being arranged such that the cover mounting aperture registers axially with the core mounting aperture, and wherein the frustoconical radially outward portion of the core and the lip on the cover are confrontationally arranged, the second latch system being disposed in the confrontationally arranged portions of the cover and the core.

10. The centrifuge rotor of claim 9 wherein the second latch system comprises:

a second recess formed in the frustoconical portion of the core, a second latching opening in the lip portion of the cover, the second recess and the second latching opening registering with each other, a second latching member received in the second recess such that a portion thereof extends into and is received by the second latching opening, thereby to latch the cover to the core; and a plunger extensible to engage the potion of the second latching member received by the second latching opening and to urge the portion of the latching member therefrom, thereby to unlatch the cover from the core.

11. A centrifuge instrument for rotating a sample container about an axis of rotation, the instrument comprising:

a rotor, the rotor comprising:

a core having at least one container-receiving cavity extending completely therethrough;

a floor, the floor and the core being positioned relative to each other so that, unless inhibited by the floor a container receivable within the cavity in the core would drop by gravity therefrom, the floor and the core being movable together as a unit and also being movable with respect to each other from a closed position to an open position, in the closed position the floor at least partially closes the cavity in the core to inhibit a container receivable within the core from dropping from the core in response to gravity, while in the open position the container receivable within the cavity responds to gravity to drop from the core;

a first latch system for selectably latching the floor and the core in a latched state and in an unlatched state, in the latched state the floor and the core occupy the closed position and are movable together as a unit, in the unlatched state the core is movable with respect to the floor while the core is maintained in a predetermined angular location with respect to the axis of rotation; and a motive source connected to the core for rotating the core and the floor as a unit when the latch is in the latched state and for rotating the core with respect to the floor when the latch is in the unlatched state.

12. The instrument of claim 11 wherein the rotor further comprises:

a cover having a loading port therein, the cover and the core being movable with respect to each other;

a second latch system for selectably latching the cover and the core in a latched state and in an unlatched state, and in the latched state the cover and the core are movable together as a unit, in the unlatched state the cover is maintained in a predetermined angular loading location with respect to the axis of rotation and the core is movable with respect thereto to bring the cavity into registration beneath the loading port to permit a container to drop by gravity into the core through the loading port;

the motive source being operative to move the core with respect to the cover when the second latch is in the unlatched state.

13. The instrument of claim 12 wherein the instrument further comprises:

a tray having a loading slot therein, the slot being located at the same predetermined angular loading location with respect to the axis of rotation as is occupied by the loading port in the cover;

so that, with the second latch in the unlatched state, as the core is moved by the motive source with respect to the cover the cavity in the core is brought into registration beneath both the loading slot in the tray and the loading port in the cover, thereby to permit a container to drop by gravity into the core through the registered loading slot in the tray and the loading port in the cover.

14. The instrument of claim 13 wherein the instrument further comprises:

a loading wheel mounted coaxially above the tray, the wheel having a plurality of cavities therein, each cavity being sized to receive a sample container; and, means for rotating the loading wheel and the core to bring a container disposed in a cavity in the wheel into registration with the slot in the tray.

15. The instrument of claim 14 wherein the instrument further comprises:

a magazines member disposed above the loading wheel, the magazine member having at least one magazine therein for generating a singulated stream of sample containers and for sequentially guiding each container in the stream into cavities in the loading wheel as the rotating means rotates the loading wheel.

16. The instrument of claim 11 further comprising an unloading chute, the chute being located at the same predetermined angular unloading location with respect to the axis of rotation as is occupied by the unloading port in the floor, the chute being positioned to receive a sample container dropping by gravity through the unloading port.

17. The instrument of claim 11 wherein the rotor comprises:

a generally cylindrical central portion having a core mounting aperture therethrough, and a generally frustoconical radially outer portion, the container-receiving cavity having a mouth that opens in the central portion of the core, the cavity extending into the generally frustoconical radially outward portion and wherein the rotor further comprises a cover having a plurality of loading ports formed therein, each loading port being registered with the mouth of one container-receiving cavity in the core, the cover being secured to the core.

18. The instrument of claim 17 wherein the instrument further comprises:

a tray having a receiving trough therein, the trough having an opening, the opening being axially registered with one of the loading ports in the cover, whereby a container drops by gravity into the core through the registered opening in the trough and the corresponding loading port in the cover.

19. The instrument of claim 18 wherein the instrument further comprises:

a magazine member disposed above the tray, the magazine member having at least one magazine therein for generating a singulated stream of sample containers; and a loading member for loading a sample container from the magazine member into the receiving trough.

20. The instrument of claim 19 wherein the loading member comprises:

a motor; and a loading rod acting in cooperation with the motor, the loading rod urging the sample container from the magazine into the receiving trough.

21. In a sample test analyzer having a sample analysis device, a centrifuge instrument having a rotor for exposing a sample in a sample container to a centrifugal force field, and, a transport for transporting small containers having a sample therein from the centrifuge instrument to the sample analysis device, an improved rotor comprising:

a core having at least one container-receiving cavity extending completely therethrough; and a floor, the floor and the core being positioned relative to each other so that, unless inhibited by the floor a container receivable within the cavity in the core would drop by gravity therefrom, the floor and the core being movable together as a unit and also being movable with respect to each other from a closed position to an open position, in the closed position the floor at least partially closes the cavity in the core to inhibit a container receivable within the core from dropping from the core in response to gravity, while in the open position the container receivable within the cavity responds to gravity to drop from the core.

22. The centrifuge rotor of claim [1] *24* wherein the container-receiving cavity has a mouth that opens in the central portion of the core, the cavity extending into the generally frustoconical radially outward portion.

23. The centrifuge rotor of claim 22 wherein the rotor further comprises a cover, the cover comprising:

a generally cylindrical central portion having a mounting aperture and a plurality of loading ports formed therein;

a generally frustoconical radially outward skirt portion; and wherein each of the plurality of loading ports is axially registered with the container-receiving cavities in the core.

*24. A centrifuge rotor for rotating a sample container about an axis of rotation, the rotor comprising:*

*a core having at least one container-receiving cavity extending completely therethrough, the core comprising: a generally cylindrical central portion having a core mounting aperture therethrough; and, a generally frustoconical radially outward portion, the container-receiving cavity being disposed in the generally frustoconical radially outward portion;*

*a floor, the floor and the core being positioned relative to each other so that, unless inhibited by the floor a container receivable within the cavity in the core would drop by gravity therefrom, the floor and the core being movable together as a unit and also being movable with respect to each other from a closed position to an open position, in the closed position the floor at least partially closes the cavity in the core to inhibit a container receivable within the core from dropping from the core in response to gravity, while in the open position the container receivable within the cavity responds to gravity to drop from the core; and,*

*a first latch system for selectably latching the floor and the core to maintain the core and the floor in the closed position.*

* * * * *